US012462759B2

(12) United States Patent
Shan

(10) Patent No.: US 12,462,759 B2
(45) Date of Patent: Nov. 4, 2025

(54) APPARATUS AND METHOD FOR PROVIDING POWER ON AND POWER OFF TIMING SEQUENCE FOR DRIVING DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Dongxiao Shan, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/790,011

(22) PCT Filed: Mar. 28, 2022

(86) PCT No.: PCT/CN2022/083384
§ 371 (c)(1),
(2) Date: Jun. 29, 2022

(87) PCT Pub. No.: WO2023/273444
PCT Pub. Date: Jan. 5, 2023

(65) Prior Publication Data
US 2024/0185796 A1 Jun. 6, 2024

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01);
(Continued)

(58) Field of Classification Search
CPC ........... G09G 3/3266; G09G 2310/061; G09G 2310/08
See application file for complete search history.

(56) References Cited

U.S. PATENT DOCUMENTS

2003/0103022 A1* 6/2003 Noguchi .............. G09G 3/3233 345/77
2006/0012551 A1 1/2006 Chiu et al.
(Continued)

FOREIGN PATENT DOCUMENTS

CN 1763822 A 4/2006
CN 101409059 A 4/2009
(Continued)

OTHER PUBLICATIONS

First Office Action Issued for CN Application No. 202280000570.3 mailed on Dec. 23, 2024, 15 pages translation included.

*Primary Examiner* — David D Davis
(74) *Attorney, Agent, or Firm* — Raj S. Dave; Dave Law Group LLC

(57) ABSTRACT

Embodiments of the present disclosure relate to an apparatus and method for providing power on and power off timing sequence for driving a display panel. The display panel includes a pixel circuit, a gate driving circuit, and a source driving circuit. The apparatus for driving a display panel is configured to: during a first time period, provide an invalid start signal to the gate driving circuit and/or a light-emitting control driving circuit; during a second time period, provide a first power signal and a second power signal to the pixel circuit; and during a third time period, provide a valid start signal to the gate driving circuit and/or the light-emitting control driving circuit.

17 Claims, 20 Drawing Sheets

(52) U.S. Cl.
CPC ............... *G09G 2300/0842* (2013.01); *G09G 2300/0861* (2013.01); *G09G 2310/0286* (2013.01); *G09G 2310/08* (2013.01); *G09G 2320/0247* (2013.01); *G09G 2330/026* (2013.01); *G09G 2330/027* (2013.01)

(56) References Cited

U.S. PATENT DOCUMENTS

| | | | | |
|---|---|---|---|---|
| 2007/0001980 | A1 | 1/2007 | Bae | |
| 2008/0157684 | A1* | 7/2008 | Chung | G11C 19/184 315/169.3 |
| 2008/0158109 | A1* | 7/2008 | Chung | G09G 3/3233 345/76 |
| 2008/0211744 | A1* | 9/2008 | Lee | G09G 3/3208 315/169.3 |
| 2008/0211745 | A1* | 9/2008 | Lee | G09G 3/3266 315/169.3 |
| 2016/0204165 | A1* | 7/2016 | Yang | G06F 3/04184 345/174 |
| 2016/0275859 | A1 | 9/2016 | Tseng | |
| 2018/0197472 | A1 | 7/2018 | Yang et al. | |
| 2019/0012969 | A1 | 1/2019 | Ji | |
| 2019/0325823 | A1* | 10/2019 | Yang | G09G 3/3233 |
| 2020/0273410 | A1 | 8/2020 | Yu et al. | |
| 2021/0166636 | A1* | 6/2021 | Li | G09G 3/3283 |
| 2021/0225282 | A1* | 7/2021 | Cho | G09G 3/3233 |
| 2021/0256927 | A1* | 8/2021 | Yang | G09G 3/3677 |
| 2021/0264862 | A1* | 8/2021 | Wang | G09G 3/3275 |

FOREIGN PATENT DOCUMENTS

| | | | | | |
|---|---|---|---|---|---|
| CN | 103943064 | A | | 7/2014 | |
| CN | 104505024 | A | | 4/2015 | |
| CN | 105185331 | A | | 12/2015 | |
| CN | 105702207 | A | | 6/2016 | |
| CN | 106652903 | A | | 5/2017 | |
| CN | 107077260 | A | * | 8/2017 | G06F 3/041662 |
| CN | 109283991 | A | * | 1/2019 | |
| CN | 109493781 | A | | 3/2019 | |
| CN | 107346030 | B | * | 5/2019 | G01T 1/36 |
| CN | 110033742 | A | | 7/2019 | |
| CN | 110264971 | A | | 9/2019 | |
| CN | 110853584 | A | * | 2/2020 | G09G 3/3208 |
| CN | 111261092 | A | | 6/2020 | |
| CN | 111312183 | A | | 6/2020 | |
| CN | 112992092 | A | | 6/2021 | |
| CN | 213583064 | U | | 6/2021 | |
| CN | 113936602 | A | | 1/2022 | |
| JP | 2005084559 | A | | 3/2005 | |
| WO | WO-2018205658 | A1 | * | 11/2018 | G09G 3/3208 |
| WO | WO-2019010977 | A1 | * | 1/2019 | G09G 3/32 |

* cited by examiner

LTPS power-off timing sequence

APPARATUS AND METHOD FOR PROVIDING POWER ON AND POWER OFF TIMING SEQUENCE FOR DRIVING DISPLAY PANEL

CROSS REFERENCE TO RELATED APPLICATIONS

This application is a National Stage of PCT/CN2022/083384 filed Mar. 28, 2022, which claims the benefit and priority of PCT/CN2021/103599, filed Jun. 30, 2021. The entire disclosures of the above applications are incorporated herein by reference.

TECHNICAL FIELD

Embodiments of the present disclosure generally relate to display technology, particularly, to an apparatus and method for driving a display panel.

BACKGROUND

This section is merely used to provide background technology to facilitate a better understanding of the present disclosure. Accordingly, the statements in this section are to be read in this light and do not relate to admissions of what is in the prior art or is not in the prior art.

With the development of display technology, the circuit structure of a display panel is often more complex.

For example, an OLED panel uses more Thin-Film Transistors (TFTs) than a Liquid Crystal Display (LCD) panel, and the circuit is more complex.

More complex circuits can lead to more potential problems. For example, during the power-on and/or power-off process of the OLED display panel, each transistor in the pixel circuit may be in an unstable state, resulting in flickering images and/or short circuit problems.

SUMMARY

This summary provides a brief description of aspects of the present disclosure that are further described in the detailed description. This summary neither identify key features or essential features of the claimed subject matter, nor does it limit the scope of the claimed subject matter.

An object of the present disclosure is to provide an improved apparatus and method for driving a display panel, so as to solve the above-mentioned problems or other problems that may occur during the power-on and/or power-off process of the display panel.

An aspect of the present disclosure provides an apparatus for driving a display panel. The display panel includes a pixel circuit, a gate driving circuit, and a source driving circuit. The apparatus for driving a display panel is configured to: during a first time period, provide an invalid start signal to the gate driving circuit and/or a light-emitting control driving circuit; during a second time period, provide a first power signal and a second power signal to the pixel circuit; and during a third time period, provide a valid start signal to the gate driving circuit and/or the light-emitting control driving circuit.

In embodiments of the present disclosure, during the first time period, a power terminal of the pixel circuit is grounded.

In embodiments of the present disclosure, during the first time period, the source driving circuit is caused to output a ground signal.

In embodiments of the present disclosure, the apparatus for driving a display panel is configured to: during the first time period, provide a third power signal and a fourth power signal to the gate driving circuit; provide a clock signal to the gate driving circuit; and provide an invalid first start signal to the gate driving circuit.

In embodiments of the present disclosure, during the first time period and the second time period, the first start signal is kept invalid.

In embodiments of the present disclosure, the apparatus for driving a display panel is further configured to: during the third time period, cause the source driving circuit to provide a display data signal to the pixel circuit.

In embodiments of the present disclosure, the display panel further includes a light-emitting control driving circuit for outputting a light-emitting control signal to the pixel circuit.

The apparatus for driving a display panel is further configured to: drive the light-emitting control driving circuit during the first time period.

In embodiments of the present disclosure, the apparatus for driving a display panel is configured to: during the first time period, provide the third power signal and the fourth power signal to the power terminal of the light-emitting control driving circuit; provide a clock signal to the light-emitting control driving circuit; and provide an invalid second start signal to the light-emitting control driving circuit.

In embodiments of the present disclosure, the apparatus for driving a display panel is further configured to: during the third time period, cause the source driving circuit to provide a display data signal to the pixel circuit. During the first time period and the second time period, the first start signal provided to the source driving circuit and the second start signal provided to the light-emitting control driving circuit remain invalid. During the third time period, the second start signal remains invalid until the first start signal of the gate driving circuit becomes valid.

In embodiments of the present disclosure, during the first time period, the first start signal provided to the source driving circuit and the second start signal provided to the light-emitting control driving circuit remain invalid. During the second time period, the second start signal remains invalid.

In embodiments of the present disclosure, during the second time period, a display data signal corresponding to displaying black is provided to the pixel circuit.

In embodiments of the present disclosure, the pixel circuit includes a driving power terminal and a reference power terminal. The apparatus for driving a display panel is configured to: during the second time period, provide the first power signal and the second power signal to the driving power terminal; and supply power to the reference power terminal.

In embodiments of the present disclosure, the first time period includes the time duration of at least one display frame, and the second time period includes the time duration of at least one display frame.

In embodiments of the present disclosure, the first time period and the second time period do not overlap.

In embodiments of the present disclosure, the display panel further includes a multiplexing circuit provided between the source driving circuit and the pixel circuit. When the source driving circuit is caused to output a ground signal, the multiplexing circuit is turned on.

Another aspect of the present disclosure provides an apparatus for driving a display panel. The display panel includes a pixel circuit, a gate driving circuit, and a source driving circuit. The apparatus for driving a display panel is configured to: during a fourth time period, provide an invalid start signal to the gate driving circuit and/or the light-emitting control driving circuit; during a fifth time period, disconnect a first power signal and a second power signal provided to the pixel circuit; and during a sixth time period, disconnect a third power signal and a fourth power signal provided to the gate driving circuit and/or the light-emitting control driving circuit.

In embodiments of the present disclosure, during the fourth time period, an invalid start signal is provided to the light-emitting control driving circuit.

In embodiments of the present disclosure, during the fourth time period, a valid start signal is provided to the gate driving circuit; and during the fourth time period, provide a display data signal corresponding to displaying black to the pixel circuit.

In embodiments of the present disclosure, during the fourth time period, an invalid start signal is provided to the gate driving circuit.

In embodiments of the present disclosure, during the fifth time period, an invalid start signal is provided to the gate driving circuit and the light-emitting control driving circuit.

In embodiments of the present disclosure, the pixel circuit includes a driving power terminal and a reference power terminal; wherein during the fifth time period, the driving power terminal and the reference power terminal are grounded; wherein during the fifth time period, the source driving circuit outputs a ground signal.

In embodiments of the present disclosure, during the sixth time period, the power terminal of the gate driving circuit and/or the light-emitting control driving circuit is grounded.

Another aspect of the present disclosure provides an apparatus for driving a display panel. The display panel includes a pixel circuit, a gate driving circuit, and a source driving circuit. The apparatus for driving a display panel is configured to: during a first time period, provide an invalid start signal to a gate driving circuit and/or a light-emitting control driving circuit; during a second time period, provide a first power signal and a second power signal to the pixel circuit; during a third time period, provide a valid start signal to the gate driving circuit and/or the light-emitting control driving circuit; during a fourth time period, provide an invalid start signal to the gate driving circuit and/or the light-emitting control driving circuit; during a fifth time period, disconnect the first power signal and the second power signal provided to the pixel circuit; and during a sixth time period, disconnect the third power signal and the fourth power signal provided to the gate driving circuit and/or the light-emitting control driving circuit.

In embodiments of the present disclosure, the apparatus for driving a display panel is integrated with the display panel.

Another aspect of the present disclosure also provides a method for driving a display panel using the apparatus for driving a display panel according to any one of the above embodiments.

Another aspect of the present disclosure also provides a display panel. The display panel includes: a pixel circuit, a gate driving circuit, a source driving circuit, and the apparatus for driving the display panel according to any one of the above embodiments.

According to embodiments of the present disclosure, an improved power-on timing sequence is provided for the display panel, which can avoid problems such as display screen flickering or short-circuiting caused by the unstable state of the internal circuit of the display panel during the power-on process. In addition, an improved power-off timing sequence is provided for the display panel, which can avoid problems such as display screen flickering or short-circuiting caused by the unstable state of the internal circuit of the display panel during the power-off process.

BRIEF DESCRIPTION OF THE DRAWINGS

In order to explain the technical solutions of embodiments of the present disclosure more clearly, the accompanying drawings of embodiments will be briefly introduced below. Obviously, the drawings in the following description only relate to some embodiments of the present disclosure, rather than limit the present disclosure.

FIG. 1(*b*) is an exemplary block diagram illustrating an apparatus for driving a display panel according to embodiments of the present disclosure.

FIG. 4(*b*) is an exemplary timing sequence diagram of the pixel unit of FIG. 4(*a*).

FIG. 5(*b*) is an exemplary timing sequence diagram of the gate driving circuit of FIG. 5(*a*).

FIG. 6(*b*) is an exemplary timing sequence diagram of the light-emitting control driving circuit in FIG. 6(*a*).

FIG. 6(*c*) is a circuit diagram of another exemplary light-emitting control driving circuit.

FIG. 6(*d*) is a circuit diagram of another exemplary light-emitting control driving circuit.

FIG. 7(*b*) is an exemplary timing sequence diagram of the pixel unit in FIG. 7(*a*).

FIG. 8(*b*) is a flowchart showing additional steps of the method shown in FIG. 2.

FIG. 8(*c*) is a flowchart showing additional steps of the method shown in FIG. 2.

FIG. 8(*d*) is an exemplary timing sequence diagram corresponding to a method for driving a display panel according to embodiments of the present disclosure.

FIG. 12(*b*) is an exemplary timing sequence diagram of the pixel unit in FIG. 12(*a*).

FIG. 13(*b*) is an exemplary timing sequence diagram of the additional gate driving circuit of FIG. 13(*a*).

DETAILED DESCRIPTION

In order to make the technical solutions and advantages of embodiments of the present disclosure clearer, the technical solutions of embodiments of the present disclosure will be described below clearly and completely in conjunction with the accompanying drawings of embodiments of the present disclosure. Obviously, the described embodiments are part of embodiments of the present disclosure, not all of embodiments. Based on the described embodiments of the present disclosure, all other embodiments obtained by those of ordinary skill in the art without creative labor are also within the protection scope of the present disclosure.

Unless otherwise defined, technical or scientific terms used in the present disclosure shall have the ordinary meaning as understood by those of ordinary skill in the art to which the present disclosure belongs. As used in the present disclosure, "first," "second," and similar terms do not denote any order, quantity, or importance, but are merely used to distinguish different components. Likewise, words such as "a," "an," or "the" do not denote a limitation of quantity, but rather denote the presence of at least one. "Comprise" or "include" and similar words mean that the elements or things appearing before the word encompass the elements or things recited after the word and their equivalents, but do not exclude other elements or things. Words like "coupled" or "connected" are not limited to physical or mechanical coupling, but may include electrical coupling, whether direct or indirect. "Up", "Down", "Left", "Right", etc. are only used to represent the relative positional relationship, and when the absolute position of the described object changes, the relative positional relationship may also change accordingly.

Figure 1A:
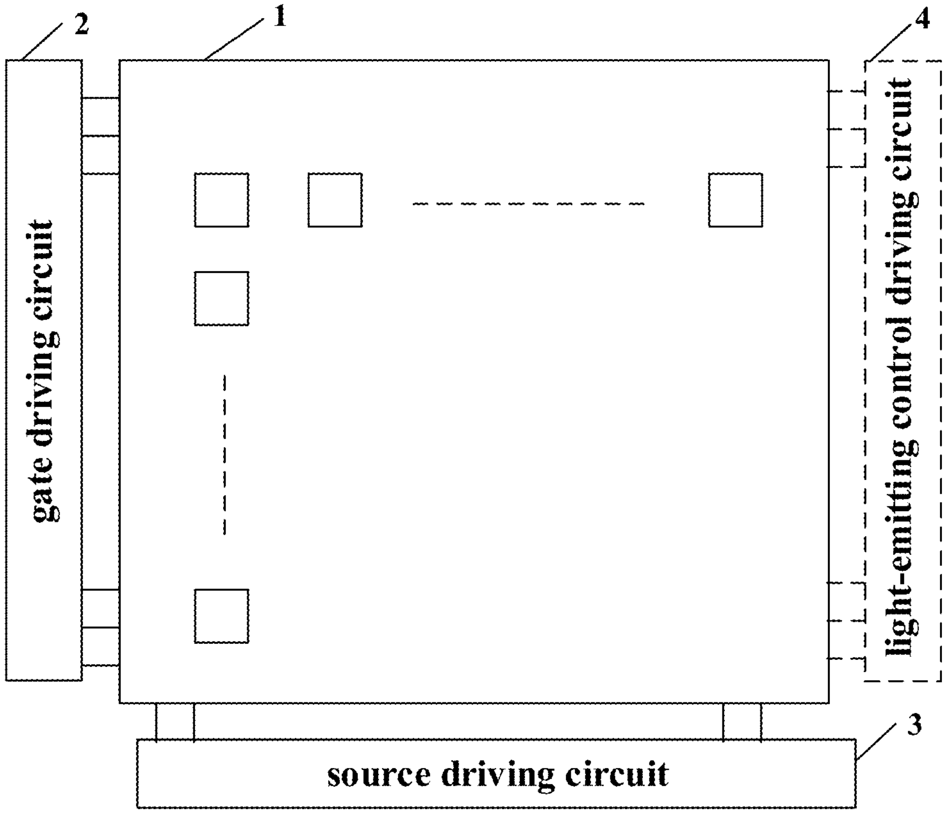
FIG. 1(*a*) is a block diagram illustrating the structure of an exemplary OLED display panel.
Figure 1B:
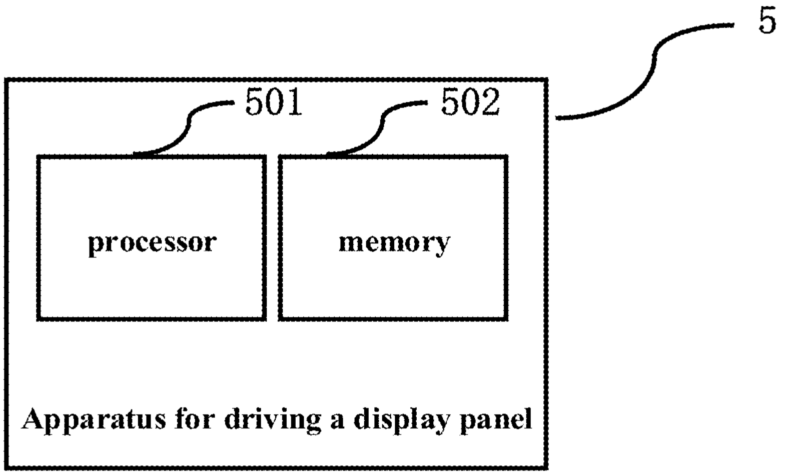

FIG. 1(*a*) is a block diagram showing the structure of an exemplary OLED display panel.

As shown in FIG. 1(*a*), as a non-limiting example of a display panel, an Organic Light-Emitting Diode (OLED) display panel may include a pixel circuit 1, a gate driving circuit 2, and a source driving circuit 3. The gate driving circuit 2 and the source driving circuit 3 respectively provide scan signals, data signals, and the like to the pixel circuit 1. The pixel circuit 1 may include a plurality of pixel units in an array, wherein each pixel unit may include an OLED element.

In addition, as an optional part, according to the specific structure of the pixel circuit, the OLED panel may further include a light-emitting control driving circuit 4 that outputs a light-emitting control signal to the pixel circuit 1. The light-emitting control driving circuit 4 can cooperate with the gate driving circuit 2 to drive the pixel circuit 1.

FIG. 1(*b*) is an exemplary block diagram illustrating an apparatus for driving a display panel according to embodiments of the present disclosure.

Figure 2:
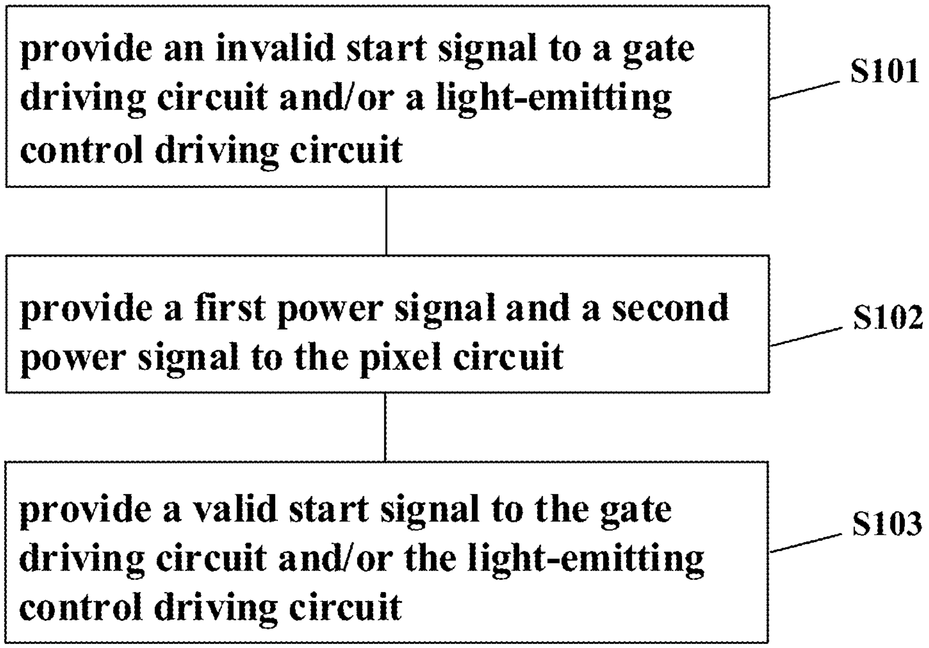
FIG. 2 is an exemplary flowchart illustrating a method for driving a display panel according to embodiments of the present disclosure.

The apparatus for driving a display panel in embodiments of the present disclosure can be used for driving the display panel, and in particular, can perform the method for driving the display panel described in embodiments of the present disclosure, for example, the method shown in following FIGS. 2, 8(*a*), 8(*b*), 8(*c*), 15, etc.

As shown in FIG. 1(*b*), the apparatus 5 for driving the display panel may include: a processor 501 and a memory 502. The processor 501 may be any kind of processing component, such as one or more microprocessors or microcontrollers, or other digital hardware, such as a digital signal processor (DSP), special purpose digital logic circuit, field programmable gate array (FPGA), application-specific integrated circuit (ASIC), etc. The memory 502 may be any type of storage component, such as read only memory (ROM), random access memory, cache memory, flash memory device, optical storage device, and the like.

The memory 502 may store software executed by the processor 501. When the processor 501 executes the software, it can be used to drive the display panel, especially to implement the method for driving the display panel in embodiments of the present disclosure.

In embodiments of the present disclosure, the apparatus for driving the display panel may be integrated with the display panel, or provided inside the display panel. Therefore, the apparatus may also be referred to as a drive apparatus/module, a power control apparatus/module, or a power-on and power-off apparatus/module, and the like, of a display panel.

FIG. 2 is an exemplary flowchart illustrating a method for driving a display panel according to embodiments of the present disclosure.

Embodiments of the present disclosure may be applied to the OLED display panel shown in FIG. 1, as well as any other suitable display panels. Therefore, embodiments of the present disclosure also include such a display panel to which the method is applied. The display panel in embodiments of the present disclosure may be driven by this method.

The method for driving a display panel shown in FIG. 2 may include: step S101, during a first time period, providing an invalid start signal to a gate driving circuit and/or a light-emitting control driving circuit; step S102, during a second time period, providing a first power signal and a second power signal to the pixel circuit; and step S103, during a third time period, providing a valid start signal to the gate driving circuit and/or the light-emitting control driving circuit.

According to embodiments of the present disclosure, in the process of powering on the display panel, operations such as driving the gate driving circuit, powering the pixel circuit, and providing display data are performed during different time periods. In this way, it is possible to prevent the transistors in the pixel circuit from being driven when the state thereof is unstable, thereby effectively preventing the display screen flickering, or the short-circuiting and other problems.

After the above power-on process is completed, the display panel can enter a normal display process. That is, in a normal display process, the gate driving circuit periodically (for example, taking a display frame as a cycle) drives the pixel circuit (turns the transistors in the pixel circuit on or off according to a predetermined timing sequence), and the source driver periodically provides display data to the pixel circuit, so that the OLED in the pixel circuit operates corresponding to the display data of each display frame (e.g., emits light with corresponding brightness), so that the OLED display panel can display the image of each frame.

In embodiments of the present disclosure, during the first time period, the power terminal in the pixel circuit may be grounded. In this way, the transistors in the pixel circuit can be turned off more reliably, the anti-interference ability during the power-on process can be improved, and problems such as display screen flickering or short-circuiting can be effectively prevented.

In embodiments of the present disclosure, during the first time period, the source driving circuit may be caused to output a ground signal. In this way, the pixel circuit receives the ground signal instead of the display data signal, which can further prevent the interference signal from being input to the pixel circuit as the display data during the power-on process, which can effectively prevent the problems such as display screen flickering or the short-circuiting.

In embodiments of the present disclosure, the first time period and the second time period do not overlap. According to this method, it can be ensured that after the gate driving circuit completes the initialization (i.e., after the pixel circuit can be driven completely according to a predetermined display timing sequence), power and/or display data can be provided to the pixel circuit. This can more effectively prevent problems such as the display screen flickering, or the short-circuiting.

In embodiments of the present disclosure, the first time period includes the time duration of at least one display frame, and the second time period includes the time duration of at least one display frame. Considering that each circuit module such as the power supply may take a time period to enter a stable state, according to this method, it can be ensured that each circuit module enters a stable working state after the power-on process is completed, and problems such as screen flickering or short-circuiting are avoided.

Hereinafter, the method for driving the display panel according to embodiments of the present disclosure will be further described with reference to the exemplary circuit structure of the exemplary OLED display panel. It should be understood that the following circuit structures are merely exemplary and not limiting the methods described with respect to embodiments of the present disclosure. The method for driving a display panel described in embodiments of the present disclosure can be applied to transformations and improvements of the following circuit structures.

Figure 3:
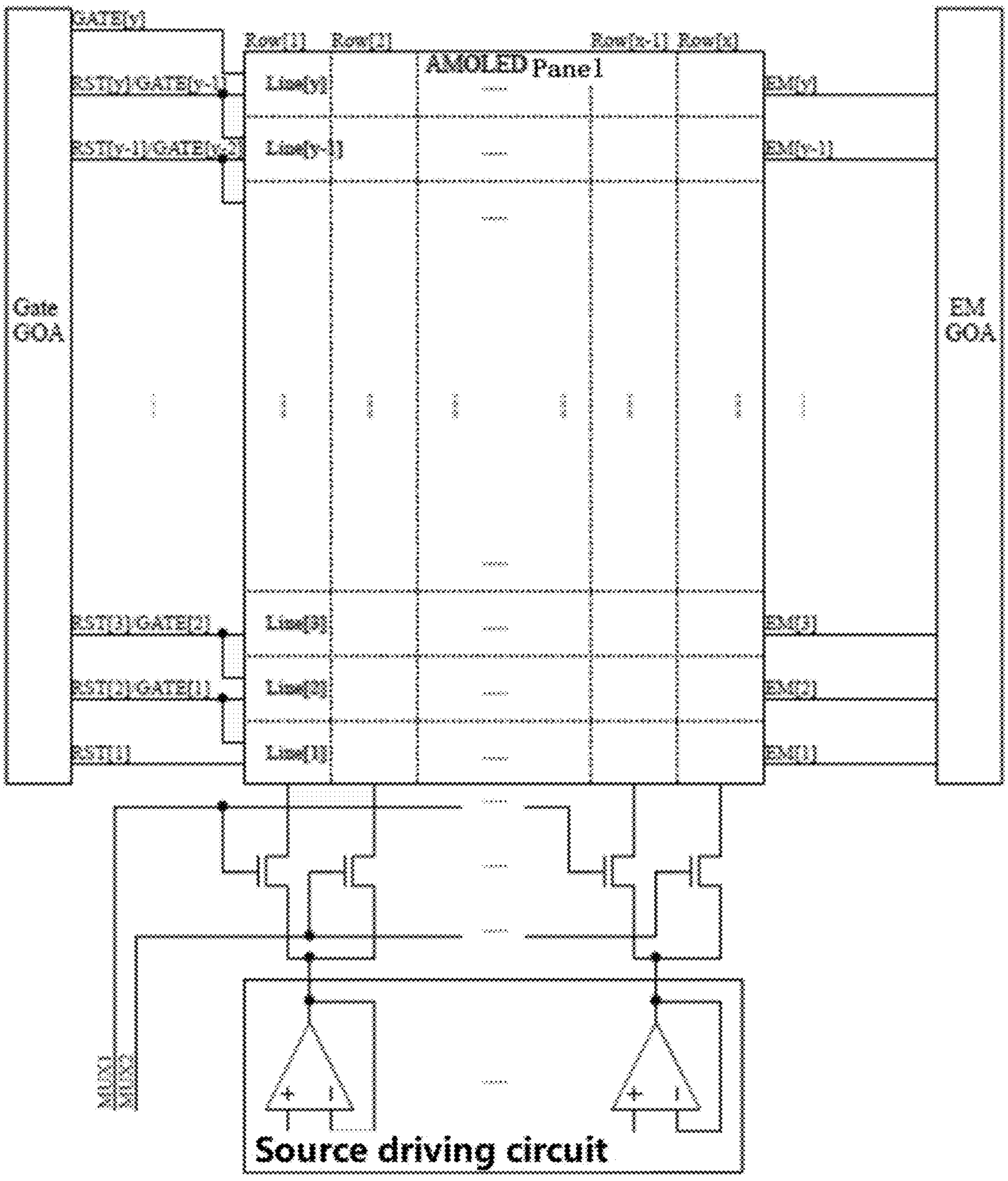
FIG. 3 is a block diagram illustrating the structure of another exemplary OLED display panel.

FIG. 3 is a block diagram showing the structure of another exemplary OLED display panel.

As shown in FIG. 3, a pixel circuit 1 includes a plurality of pixel units in an array, which can be denoted as the first line (Line[1]) to the yth line (Line[y]), and the first row (Row[1]) to the xth row (Row[x]). x and y are positive integers.

An OLED display panel can use a so-called line scan operation mode. In a display frame, a gate driving circuit 2 and a light-emitting control driving circuit 4 sequentially scan each line of pixel units, and correspondingly, the source driving circuit 3 sequentially provides data signals to the scanned pixel units of each line. Display data signals may be represented using Source, Vdata, Data, etc. in the following sections of this document.

For example, taking a scan of the pixel units of the first line (Line[1]) as an example, the gate driving circuit 2 first outputs a valid reset signal (RST[1]), so that the pixel units of the first line (Line[1]) are reset. Then, the gate driving circuit 2 outputs a valid gate driving signal (GATE[1]), so that the data signal provided by the source driving circuit 3 can be written into the pixel units of the first line (Line[1]). The valid gate driving signal (GATE[1]) can also be used as the reset signal (RST[2]) of the pixel units of the second line (Line[2]). Then, the light-emitting control driving circuit 4 outputs a valid light-emitting control signal (EM[1]), so that the OLEDs in the pixel units of the first line (Line[1]) operate corresponding to the respective display data (for example, generate the respective corresponding brightness). The display state may continue until the end of the display frame.

The pixel units of the second line (Line[2]) to the yth line (Line[y]) will complete scanning in the same way.

It should be understood that a "valid" signal refers to a signal that can enable a subsequent circuit element (e.g., transistor) to enter a working state (e.g., being turned on). Accordingly, corresponding to different subsequent circuit elements, the specific attributes (e.g., amplitude) of the "valid" signal may vary. For example, for an N-type transistor, the valid signal may be a relatively high-level voltage signal. For a P-type transistor, the valid signal may be a relatively low-level voltage signal. Correspondingly, an "invalid" signal refers to a signal that cannot enable a subsequent circuit element (e.g., a transistor) to enter a working state (e.g., being turned on), that is, will keep the subsequent circuit element (e.g., the transistor) turned off.

In addition, in embodiments of the present disclosure, the OLED display panel further includes a multiplexing circuit provided between the source driving circuit and the pixel circuit. The output of the source driving circuit 3 may be coupled to the multiplexing circuit 31. Under the control of a switching signal, display data provided by the source driving circuit 3 can be respectively provided to the pixel units of different rows via the multiplexing circuit. For example, as shown in FIG. 3, under the control of switching signals MUX1 and MUX2, signals for displaying data may be provided to odd-numbered rows and even-numbered rows, respectively. When MUX is valid, the switching elements in the multiplexing circuit 31 corresponding to the pixel units of the odd-numbered rows can be turned on, so that the output of the source driving circuit 3 is transmitted to the pixel units of the odd-numbered rows. When MUX2 is valid, the switching elements in the multiplexing circuit 31 corresponding to the pixel units of the even-numbered rows can be turned on, so that the output of the source driving circuit 3 is transmitted to the pixel units of the even-numbered rows. In this way, the multiplexing of the source driving circuit 3 can be realized, the circuit elements required in the source driving circuit 3 are reduced, and the occupied area, costs, etc. are correspondingly reduced.

In addition, during operation, the switching signals MUX1 and MUX2 may have completely opposite waveforms, that is, the output is either provided to the odd-numbered rows or the even-numbered rows at one timing, so as to realize the multiplexing of the output of the source driving circuit 3. Therefore, in the following description, it is also possible to merely use MUX to represent such a plurality of switching signals having a fixed waveform relationship.

As a non-limiting example, the OLED display panel in FIG. 3 may be, for example, an AMOLED (Active-matrix organic light-emitting diode) panel, and specifically may be an LTPS (Low Temperature Poly-Silicon) AMOLED display panel. According to the structure of FIG. 3, it can have the following characteristics: ① agate driving circuit (Gate Driver on Array, GOA) similar to a shift register is used to drive the reset Reset signal, gate Gate signal and light-emitting control EM signals of the pixels; ② the source multiplexing circuit is used (the switching elements (for example, thin film transistors) driven by Mux1 and Mux2 are P-channel), and some models of panels can also have no Mux circuit. In the following description, a P-channel thin film transistor will be described as an example. However, it should be understood that the type of thin film transistor can also be replaced by other types, such as N-channel.

Figures 4A, 4B:
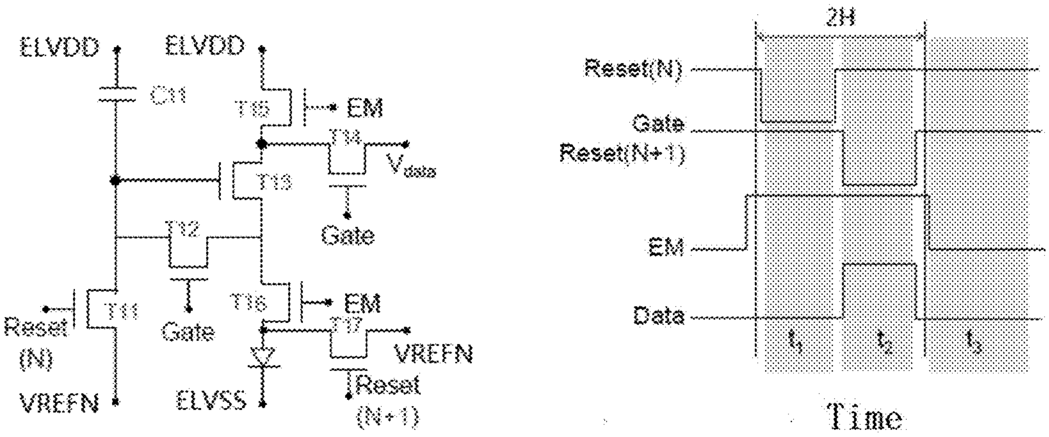
FIG. 4(*a*) is a circuit diagram of an exemplary pixel unit.

FIG. 4(*a*) is a circuit diagram of an exemplary pixel unit. FIG. 4(*b*) is an exemplary timing sequence diagram of the pixel unit of FIG. 4(*a*).

The pixel unit shown in FIG. 4(*a*) may include an eleventh transistor T11 to a seventeenth transistor T17 and an eleventh capacitor C11. In addition, it is described that the pixel unit is located in the Nth line.

A control electrode of the eleventh transistor T11 is used to input the reset signal Reset (N), a first electrode of the eleventh transistor T11 is coupled to a first reference power terminal VREFN (which may also be referred to as the initialization power terminal, and may be at a low level), and a second electrode of the eleventh transistor T11 is coupled to a control electrode of a thirteenth transistor T13 and a first electrode of a twelfth transistor T12. A control electrode of the twelfth transistor T12 is used to input a gate driving signal Gate, and a second electrode of the twelfth transistor T12 is coupled to a second electrode of a thirteenth transistor T13 and a first electrode of a sixteenth transistor T16. A first electrode of the thirteenth transistor T13 is coupled to a first electrode of a fourteenth transistor T14 and a second electrode of a fifteenth transistor T15. A control electrode of the fourteenth transistor T14 is used to input the gate driving signal Gate, and a second electrode of the fourteenth transistor T14 is used to input a display data signal Vdata. A control electrode of the fifteenth transistor T15 is used to input a light-emitting control signal EM, and a first electrode of the fifteenth transistor T15 is coupled to the power terminal (from which a high level can be inputted) for inputting the first driving power ELVDD (i.e., provided as the first power signal). A control electrode of the sixteenth transistor T16 is used to input the light-emitting control signal EM, and the second electrode of the sixteenth transistor T16 is coupled to the first electrode (which may be the anode) of the OLED. A control electrode of the seventeenth transistor T17 is used to input the reset signal Reset(N+1) (which can be the same as the gate driving signal Gate) of the pixel circuit of the next line, and a first electrode of the seventeenth transistor T17 is coupled to the first reference power terminal VREFN, a second electrode of the seventeenth transistor T17 is coupled to the first electrode of the OLED. The second electrode (which may be the cathode) of the OLED is coupled to a power terminal (from which a low level may be inputted) for inputting the second driving power ELVSS (i.e., provided as a second power signal). The first terminal of the eleventh capacitor C11 is coupled to the power terminal for inputting the first driving power ELVDD, and the second terminal is coupled to the control electrode of the thirteenth transistor T13.

The control electrode of the transistor may be the gate, the first electrode of the transistor may be either the source or the drain, and the second electrode of the transistor may be the other one of the source or the drain. Furthermore, the first electrodes of different transistors may be of different types, and the second electrodes of the transistors may be of different types.

As shown in FIG. 4(*b*), during periods of time t1 and t2, the light-emitting control signal remains invalid (invalid means that the signal cannot turn on the transistor, or in other words, turns the transistor off). During the time period t1, the reset signal Reset(N) is valid (valid means that the signal can turn on the transistor), so that the voltage of the corresponding node in the corresponding pixel circuit is reset, or initialized, or set to a reference voltage. During the time period t2, the gate driving signal Gate is valid, so that the data signal Data (i.e., Vdata) is written. After the time period t3, the light-emitting control signal is valid, and the reset signal Reset (N) and the gate driving signal Gate are invalid. The OLED operates in response to the data signal Data (e.g., emits light with predetermined brightness).

As shown in FIG. 4(*b*), the high level time duration of the light-emitting control signal EM is longer than the time period 2H shown in the figure and covers the low level of the reset signal Reset and the gate driving signal Gate during the periods of time t1 and t2.

It should be understood that the reset signal Reset(N) may be the gate driving signal Gate(N−1) of the previous line.

Figures 5A, 5B:
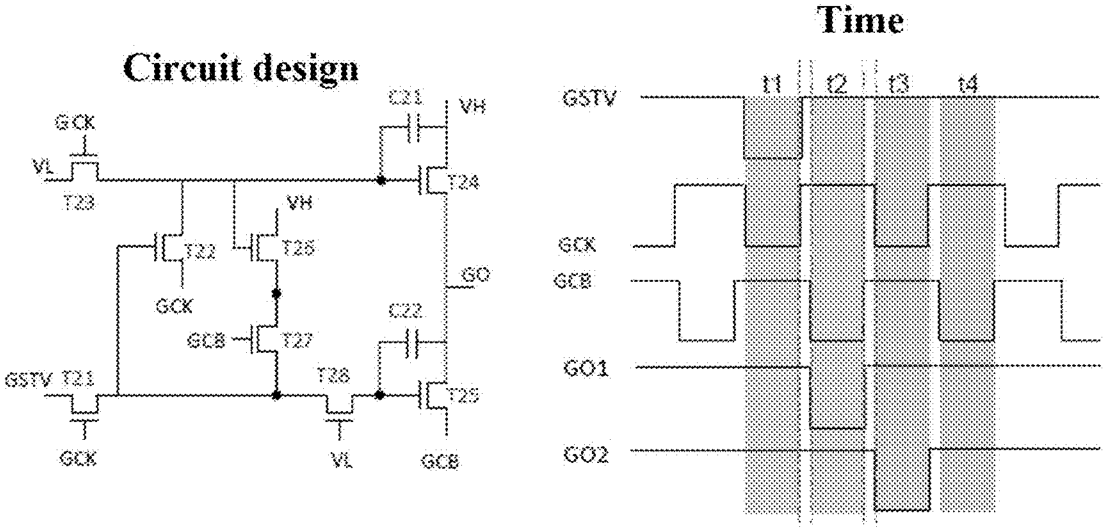
FIG. 5(*a*) is a circuit diagram of an exemplary gate driving circuit.
Figure 6A:
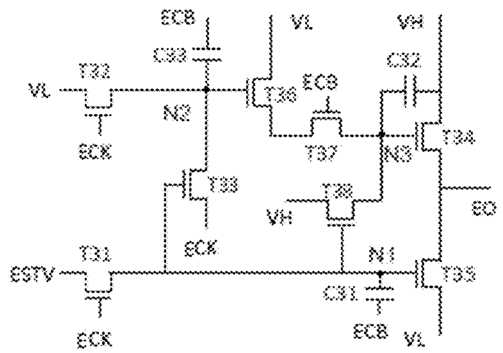
FIG. 6(*a*) is a circuit diagram of an exemplary light-emitting control driving circuit.
Figure 6B:
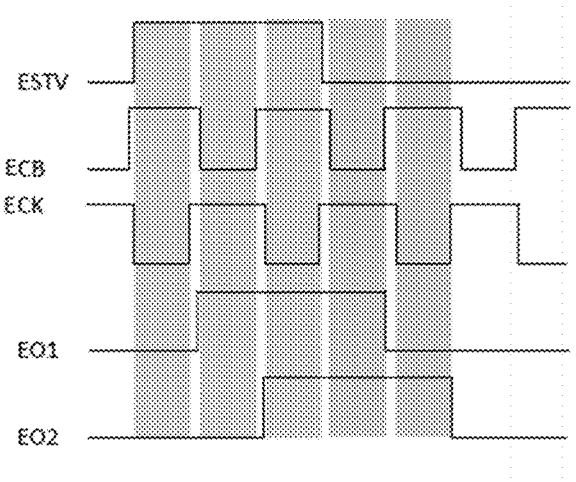
Figure 6C:
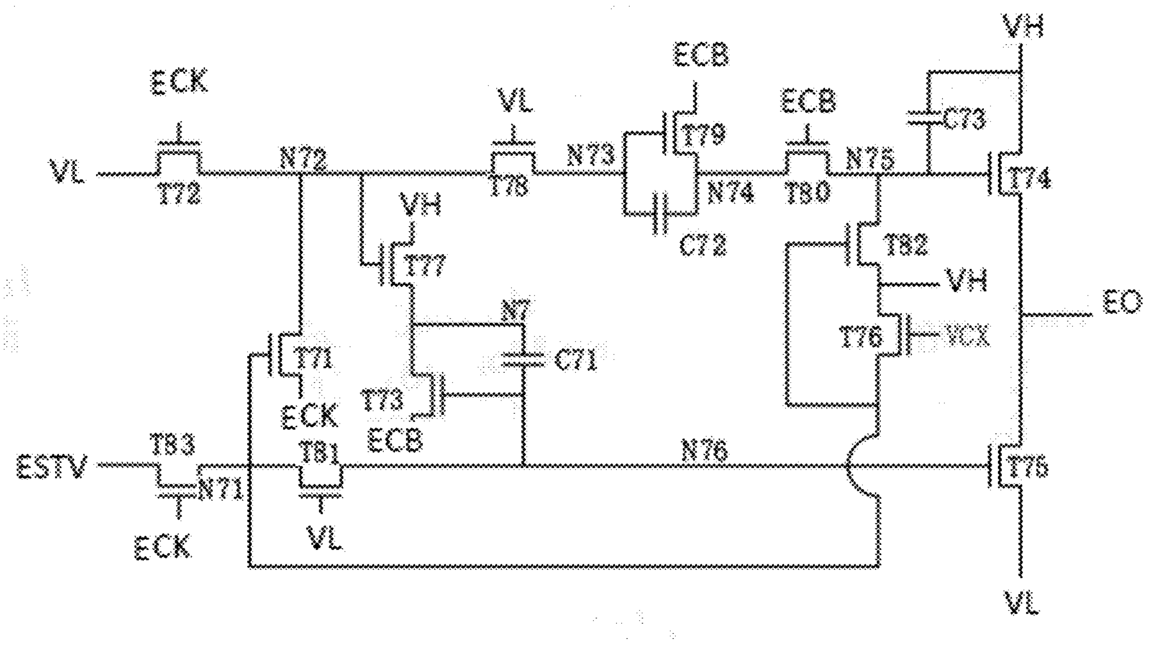
Figure 6D:
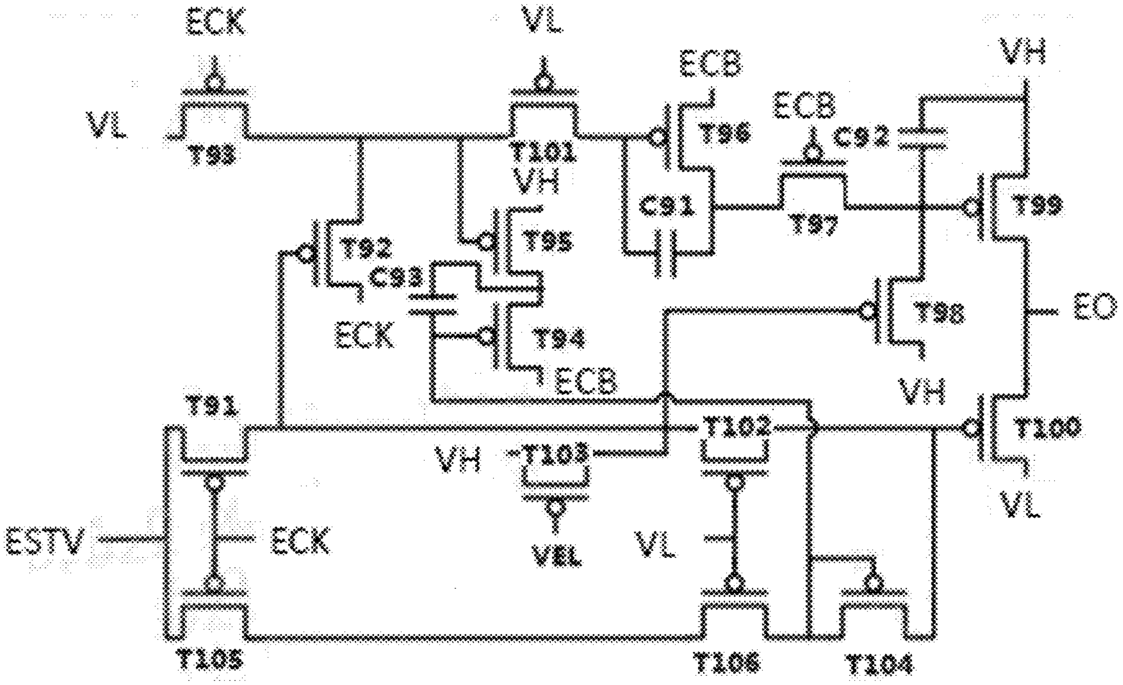

FIG. 5(*a*) is a circuit diagram of an exemplary gate driving circuit. FIG. 5(*b*) is an exemplary timing sequence diagram of the gate driving circuit of FIG. 5(*a*).

The gate driving circuit can be composed of the shift register units shown in FIG. 5(*a*) in series of stages. That is, the gate driving circuit operates as a shift register, and the shift register units at each stage sequentially output the above-mentioned reset signal and gate driving signal (which may also be collectively referred to as a line scan signal) to the pixel circuit.

As shown in FIG. 5(*a*), as a non-limiting example, such a shift register unit may include: a twenty-first transistor T21 to a twenty-eighth transistor T28 and a twenty-first capacitor C21 to a twenty-second capacitor C22.

The control electrode of the twenty-first transistor T21 is used to input the first clock signal GCK, the first electrode of the twenty-first transistor T21 is used to input the first start signal GSTV, and the second electrode of the twenty-first transistor T21 is coupled to the control electrode of the twenty-second transistor T22, the second electrode of the twenty-seventh transistor T27 and the first electrode of the twenty-eighth transistor T28. The first electrode of the twenty-second transistor T22 is used to input the first clock signal GCK, and the second electrode of the twenty-second transistor T22 is coupled to the second electrode of the twenty-third transistor T23, the control electrode of the twenty-fourth transistor T24, and the control electrode of the twenty-sixth transistor T26. The control electrode of the twenty-third transistor T23 is used to input the first clock signal GCK, and the first electrode of the twenty-third transistor T23 is coupled to the power terminal for inputting the low level VL (i.e., provided as the fourth power signal). The first electrode of the twenty-fourth transistor T24 is coupled to the power terminal for inputting the high level VH (i.e., provided as the third power signal), and the second electrode of the twenty-fourth transistor T24 is coupled to the first electrode of the twenty-fifth transistor T25 and is used to output the gate driving signal GO. The control electrode of the twenty-fifth transistor T25 is coupled to the second electrode of the twenty-eighth transistor T28, and the second electrode of the twenty-fifth transistor T25 is used to input the second clock signal GCB. The first electrode of the twenty-sixth transistor T26 is coupled to the power terminal for inputting the high level VH, and the second electrode of the twenty-sixth transistor T26 is coupled to the first electrode of the twenty-seventh transistor T27. The control electrode of the twenty-seventh transistor T27 is used to input the second clock signal GCB. The control electrode of the twenty-eighth transistor T28 is coupled to the power terminal for inputting the low level VL.

The twenty-first capacitor C21 is coupled between the control electrode and the first electrode of the twenty-fourth transistor T24. The twenty-second capacitor C22 is coupled between the control electrode and the first electrode of the twenty-fifth transistor T25.

For example, the high level VH may be a positive voltage with a predetermined magnitude, and the low level VL may be a negative voltage with a predetermined magnitude.

As shown in FIG. 5(*b*), taking the shift register unit at the first stage (for example, corresponding to the first line of pixel units) as an example, during the time period t1, the first start signal GSTV is valid, so that the shift register unit corresponding to the first line of pixel unit starts to work. The states of the first start signal GSTV, the first clock signal GCK and the second clock signal GCB are changed according to a predetermined timing, so that a valid gate driving signal GO1 is output for the first line of pixel units during the time period t2. The gate driving signal GO1 is also used as a start signal for the next-stage shift register unit (for example, corresponding to the second line of pixel units), so that the next-stage shift register unit outputs a valid gate driving signal GO2 during the time period t3 for the next line of pixel units. An so on, the shift register units at all levels work in sequence to complete the output of gate driving signals of all lines.

The circuit structures of the shift register units in two adjacent lines are exactly the same, and all stages can share two clock signals GCK and GCB.

FIG. 6(*a*) is a circuit diagram of an exemplary light-emitting control driving circuit. FIG. 6(*b*) is an exemplary timing sequence diagram of the light-emitting control driving circuit in FIG. 6(*a*).

Similar to the gate driving circuit, the light-emitting control driving circuit can be composed of the shift register units shown in FIG. 6(*a*) in series of stages. That is, the light-emitting control driving circuit also operates as a shift register, and the shift register units of each stage sequentially output the above-mentioned light-emitting control signals (which may also belong to line scanning signals) to the pixel circuit.

As shown in FIG. 6(*a*), as a non-limiting example, such a shift register unit may mainly include: the thirty-first transistor T31 to the thirty-eighth transistor T38, the thirty-first capacitor C31 to the thirty-third capacitor C33. In the figure, N1, N2, and N3 represent nodes in the circuit.

The control electrode of the thirty-first transistor T31 is used to input the third clock signal ECK, the first electrode of the thirty-first transistor T31 is used to input the second start signal ESTV, and the second electrode of the thirty-first transistor T31 is coupled to the control electrode of the thirty-third transistor T33, the control electrode of the thirty-fifth transistor T35 and the control electrode of the thirty-eighth transistor T38. The control electrode of the thirty-second transistor T32 is used to input the third clock signal ECK, the first electrode of the thirty-second transistor T32 is coupled to the power terminal for inputting the low level VL, and the second electrode of the thirty-second transistor T32 is coupled to the second electrode of the thirty-third transistor T33 and the control electrode of the thirty-sixth transistor T36. The first electrode of the thirty-third transistor T33 is used to input the third clock signal ECK. The control electrode of the thirty-fourth transistor T34 is coupled to the second electrode of the thirty-seventh transistor T37 and the second electrode of the thirty-eighth transistor T38, and the first electrode of the thirty-fourth transistor T34 is coupled to the power terminal for inputting the high level VH, and the second electrode of the thirty-fourth transistor T34 is coupled to the first electrode of the thirty-fifth transistor T35 and is used for outputting the light-emitting control signal EM. The second electrode of the thirty-fifth transistor T35 is coupled to the power terminal for inputting the low level VL. The first electrode of the thirty-sixth transistor T36 is coupled to the power terminal for inputting the low level VL, and the second electrode of the thirty-sixth transistor T36 is coupled to the first electrode of the thirty-seventh transistor T37. The control electrode of the thirty-seventh transistor T37 is used to input the fourth clock signal ECB. The first electrode of the thirty-eighth transistor T38 is coupled to the power terminal for inputting the high level VH.

The first terminal of the thirty-first capacitor C31 is coupled to the control electrode of the thirty-fifth transistor T35, and the second terminal of the thirty-first capacitor C31 is used to input the fourth clock signal ECB. The thirty-second capacitor C32 is coupled between the control electrode and the first electrode of the thirty-fourth transistor T34. The first terminal of the thirty-third capacitor C33 is coupled to the control electrode of the thirty-sixth transistor T36, and the second terminal of the thirty-third capacitor C33 is used to input the fourth clock signal ECB.

As shown in FIG. 6(*b*), taking the shift register unit at the first stage (for example, corresponding to the first line of pixel units) as an example, first, the second start signal ESTV is invalid, so that the shift register unit corresponding to the first line of pixel units outputs an invalid light-emitting control signal. The first start signal GSTV is later changed to be valid, and the states of the third clock signal ECK and the fourth clock signal ECB are changed according to a predetermined timing sequence, so that the continuously valid light-emitting control signal EO1 is output for the first line of pixel units. The light-emitting control signal EO1 is also used as a start signal for the next-stage shift register unit (for example, corresponding to the second line of pixel units), so that the next-stage shift register unit later outputs a valid light-emitting control signal EO2 for the next line of pixel units. An so on, the shift register units at all stages work in sequence to complete the output of all lines of light-emitting control signals.

FIG. 6(*c*) is a circuit diagram of another exemplary light-emitting control driving circuit.

As shown in FIG. 6(*c*), as a non-limiting example, such a shift register unit may mainly include: the seventy-first transistor T71 to the eighty-third transistor T83, and the seventy-first capacitor C71 to the seventy-third capacitor C73. In the figure, N71, N72, N73, N74, N75, N76 represent nodes in the circuit.

The control electrode of the seventy-first transistor T71 is coupled to the first electrode of the seventy-sixth transistor T76 and the control electrode of the eighty-second transistor T82, the first electrode of the seventy-first transistor T71 is used to input the third clock signal ECK, the second electrode of the seventy-first transistor T71 is coupled to the second electrode of the seventy-second transistor T72, the control electrode of the seventy-seventh transistor T77, and the first electrode of the seventy-eighth transistor T78. The control electrode of the seventy-second transistor T72 is used to input the third clock signal ECK, the first electrode of the seventy-second transistor T72 is coupled to the power terminal for inputting the low level VL. The control electrode of the seventy-third transistor T73 is coupled to the control electrode of the seventy-fifth transistor T75 and the first electrode of the eighty-first transistor T81, the first electrode of the seventy-third transistor T73 is used to input the fourth clock signal ECB, and the second electrode of the seventy-third transistor T73 is coupled to the first electrode of the seventy-seventh transistor T77. The control electrode of the seventy-fourth transistor T74 is coupled to the first electrode of the eightieth transistor T80 and the first electrode of the eighty-second transistor T82, the first electrode of the seventy-fourth transistor T74 is used to input the power terminal of the high level VH, and the second electrode of the seventy-fourth transistor T74 is coupled to the first electrode of the seventy-fifth transistor T75, and (as the output terminal EO) is used to output the light-emitting control signal EM. The second electrode of the seventy-fifth transistor T75 is coupled to the power terminal for inputting the low level VL. The control electrode of the seventy-sixth transistor T76 is coupled to another input control signal VCX, so that the seventy-sixth transistor T76 can be turned on or off as required, the second electrode of the seventy-sixth transistor T76 is coupled to the second electrode of the eighty-second transistor T82 and the power terminal for inputting the high level VH. The second electrode of the seventy-seventh transistor T77 is coupled to the power terminal for inputting the high level VH. The control electrode of the seventy-eighth transistor T78 is coupled to the power terminal for inputting the low level VL, and the second electrode of the seventy-eighth transistor T78 is coupled to the control electrode of the seventy-ninth transistor T79. The first electrode of the seventy-ninth transistor T79 is coupled to the second electrode of the eightieth transistor T80, and the second electrode of the seventy-ninth transistor T79 is used to input the fourth clock signal ECB. The control electrode of the eightieth transistor T80 is used to input the fourth clock signal ECB. The control electrode of the eighty-first transistor T81 is coupled to the power terminal for inputting the low level VL, and the second electrode of the eighty-first transistor T81 is coupled to the first electrode of the eighty-third transistor T83. The control electrode of the eighty-third transistor T83 is used to input the third clock signal ECK, and the second electrode of the eighty-third transistor T83 is used to input the second start signal ESTV.

The seventy-first capacitor C71 is coupled between the control electrode and the second electrode of the seventy-third transistor T73. The seventy-second capacitor C72 is coupled between the control electrode and the first electrode of the seventy-ninth transistor T79. The seventy-third capacitor C73 is coupled between the control electrode and the first electrode of the seventy-fourth transistor T74.

The circuit structure in FIG. 6(*c*) has a corresponding and alternative relationship with that in FIG. 6(*a*), and can be controlled by the same or similar timing sequence (e.g., both use the timing sequence in FIG. 6(*b*)). In addition, FIG. 6(*c*) mainly differs from FIG. 6(*a*) in that: the position of the capacitor C33, the position and connection relationship of the capacitor C31 in FIG. 6(*a*) are different from those in FIG. 6(*c*). In FIG. 6(*c*), the seventy-eighth transistor 178 and the eighty-first transistor T81 are added to stabilize the electric potential of the N71 node.

FIG. 6(*d*) is a circuit diagram of another exemplary light-emitting control driving circuit.

As shown in FIG. 6(*d*), as a non-limiting example, such a shift register unit may mainly include: the ninety-first transistor T91 to the one hundred and sixteenth transistor T106, and the ninety-first capacitor C91 to the ninety-third capacitor C93. That is, the structure of 16 transistors and 3 capacitors (16T3C).

The control electrode of the ninety-first transistor T91 is coupled to the control electrode of the one-hundred and fifth transistor T105 and is used to input the third clock signal ECK; the first electrode of the ninety-first transistor T91 is coupled to the first electrode of the one-hundred and fifth transistor T105 and is used to input the second start signal ESTV; and the second electrode of the ninety-first transistor T91 is coupled to the control electrode of the ninety-second transistor T92, the control electrode of the ninety-eighth transistor T98, and the first electrode of the one-hundred and second transistor T102, the first electrode of the one-hundred and third transistor T103. The first electrode of the ninety-second transistor T92 is used to input the third clock signal ECK; the second electrode of the ninety-second transistor T92 is coupled to the first electrode of the ninety-third transistor T93, the control electrode of the ninety-fifth transistor T95, the first electrode of the one-hundred and first transistor T101. The control electrode of the ninety-third transistor T93 is used to input the third clock signal ECK, and the second electrode of the ninety-third transistor T93 is coupled to the power terminal for inputting the low level VL. The control electrode of the ninety-fourth transistor T94 is coupled to the control electrode and the first electrode of the one-hundred and fourth transistor T104 and the first electrode of the one-hundred and sixth transistor T106; the first electrode of the ninety-fourth transistor T94 is used to input the fourth clock signal ECB; and the second electrode of the ninety-fourth transistor T94 is coupled to the first electrode of the ninety-fifth transistor T95. The second electrode of the ninety-fifth transistor T95 is coupled to the power terminal for inputting the high level VH. The control electrode of the ninety-sixth transistor T96 is coupled to the second electrode of the one-hundred and first transistor T101; the first electrode of the ninety-sixth transistor T96 is used to input the fourth clock signal ECB; and the second electrode of the ninety-sixth transistor T96 is coupled to the first electrode of the ninety-seventh transistor T97. The control electrode of the ninety-seventh transistor T97 is used to input the fourth clock signal ECB, and the second electrode of the ninety-seventh transistor T97 is coupled to the first electrode of the ninety-eighth transistor T98 and the control electrode of the ninety-ninth transistor T99. The second electrode of the ninety-eighth transistor T98 is coupled to the power terminal for inputting the high level VH. The first electrode of the ninety-ninth transistor T99 is coupled to the power terminal for inputting the high level VH, and the second electrode of the ninety-ninth transistor T99 is coupled to the first electrode of the hundredth transistor T100, and is used as an output terminal (EO) for outputting a light-emitting control signal EM. The control electrode of the one-hundredth transistor T100 is coupled to the second electrode of the one-hundred and second transistor T102, and the second electrode of the one-hundred and fourth transistor T104; the second electrode of the one-hundredth transistor T100 is coupled to the power terminal for inputting the low level VL. The control electrode of the one-hundred and first transistor T101 is coupled to the power terminal for inputting the low level VL. The control electrode of the one-hundred and second transistor T102 is coupled to the control electrode of the one-hundred and sixth transistor T106. The control electrode of the one-hundred and third transistor T103 is coupled to another input control signal VEL, so as to make the one-hundred and third transistor T103 enter an on or off state as required; the second electrode of the one-hundred and third transistor T103 is coupled to the power terminal for inputting the high level VH. The second electrode of the one-hundred and fifth transistor T105 is coupled to the second electrode of the one-hundred and sixth transistor T106.

The ninety-first capacitor C91 is coupled between the control electrode and the second electrode of the ninety-sixth transistor T96. The ninety-second capacitor C92 is coupled between the control electrode and the first electrode of the ninety-ninth transistor T99. The ninety-third capacitor C93 is coupled between the control electrode and the second electrode of the ninety-fourth transistor T94.

The circuit structure in FIG. 6(*d*) has a corresponding and alternative relationship with those in FIG. 6(*c*) and FIG. 6(*a*), and can be controlled by the same or similar timing (e.g., both use the timing sequence in FIG. 6(*b*)). Compared with FIGS. 6(*a*) and 6(*c*), T105 (paired with T91), T106 (paired with T102), T104, etc. are additionally provided in FIG. 6(*d*), all to further increases the stability of the N71 node in FIG. 6(*c*), as compared with the circuit structure FIG. 6(*c*).

The circuit structures corresponding to T76 and T83 in FIG. 6(*c*) are retained in FIG. 6(*d*), and the function is to reset the N1 node. When the transistor controlled by the N71 node needs to be turned off, such as in the BLANK stage between frames, before the first frame is displayed, or when an abnormality occurs (that is, it is not necessary to output the low potential of VL), then the high electric potential of VH is input to the N71 node.

The circuits shown in FIG. 4(*a*), FIG. 5(*a*), FIG. 6(*a*)/FIG. 6(*c*)/FIG. 6(*d*) above can work in cooperation with each other. It should be understood, however, that any one or more of the circuits may be replaced by circuits of other structures having the same function.

Figure 7A:
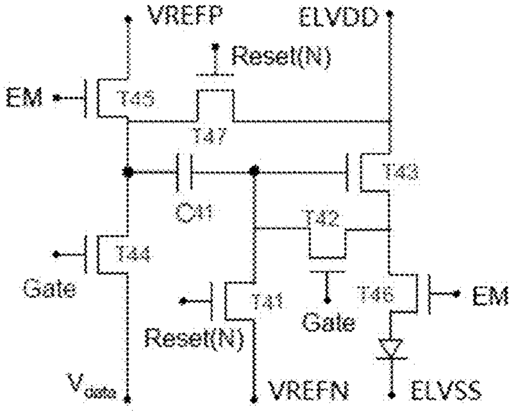
FIG. 7(*a*) is a circuit diagram of another exemplary pixel unit.
Figure 7B:
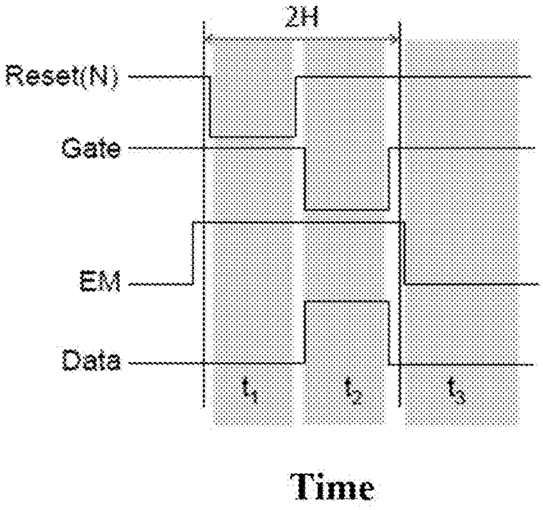
Figure 8A:
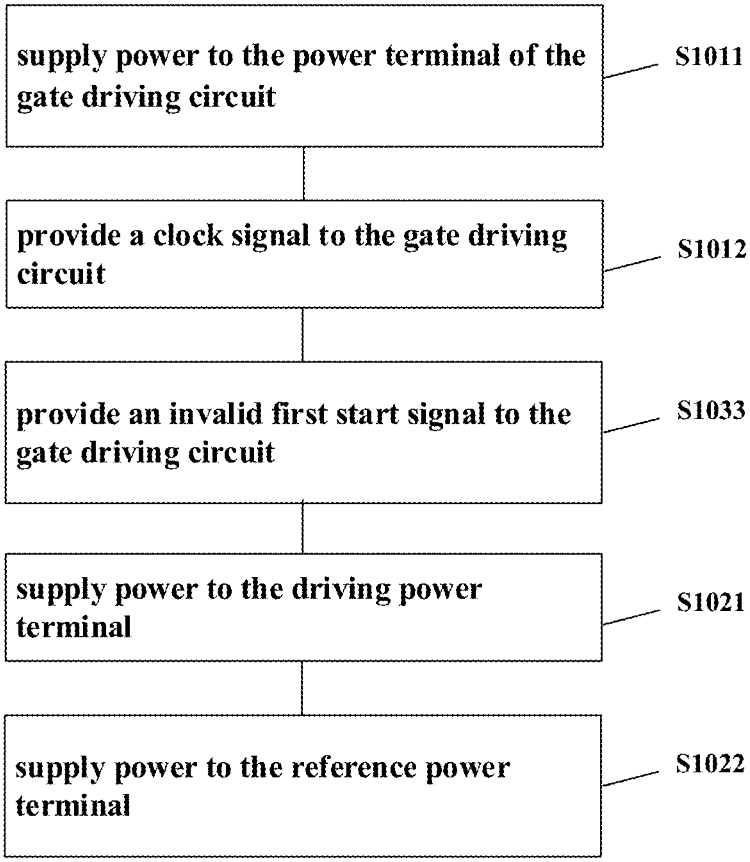
FIG. 8(*a*) is a flowchart showing sub-steps of the method shown in FIG. 2.
Figure 8B:
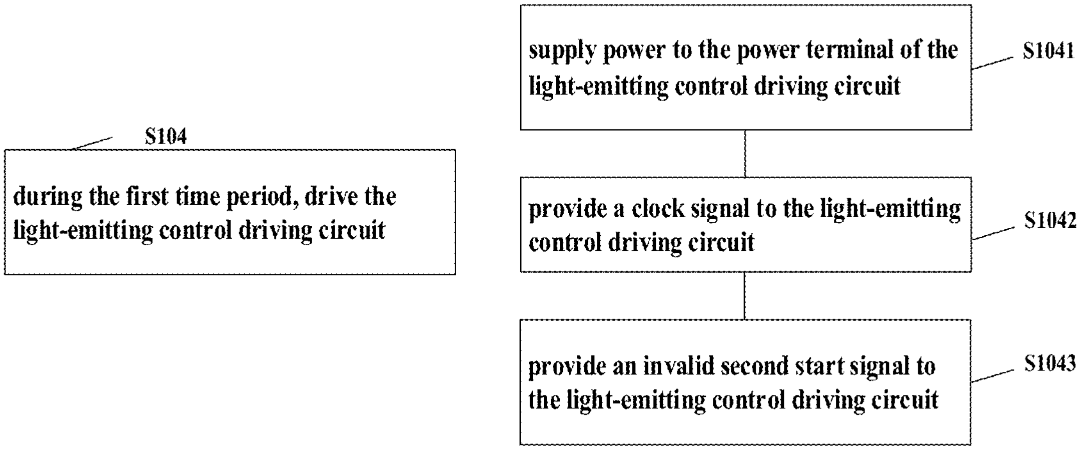
Figure 8C:
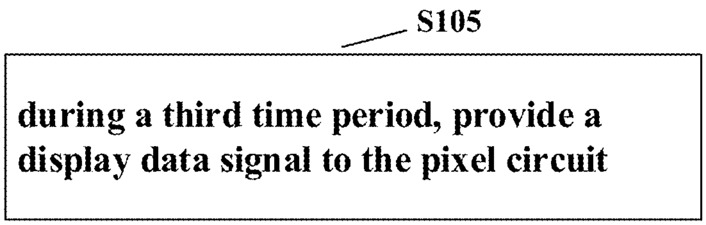
Figure 8D:
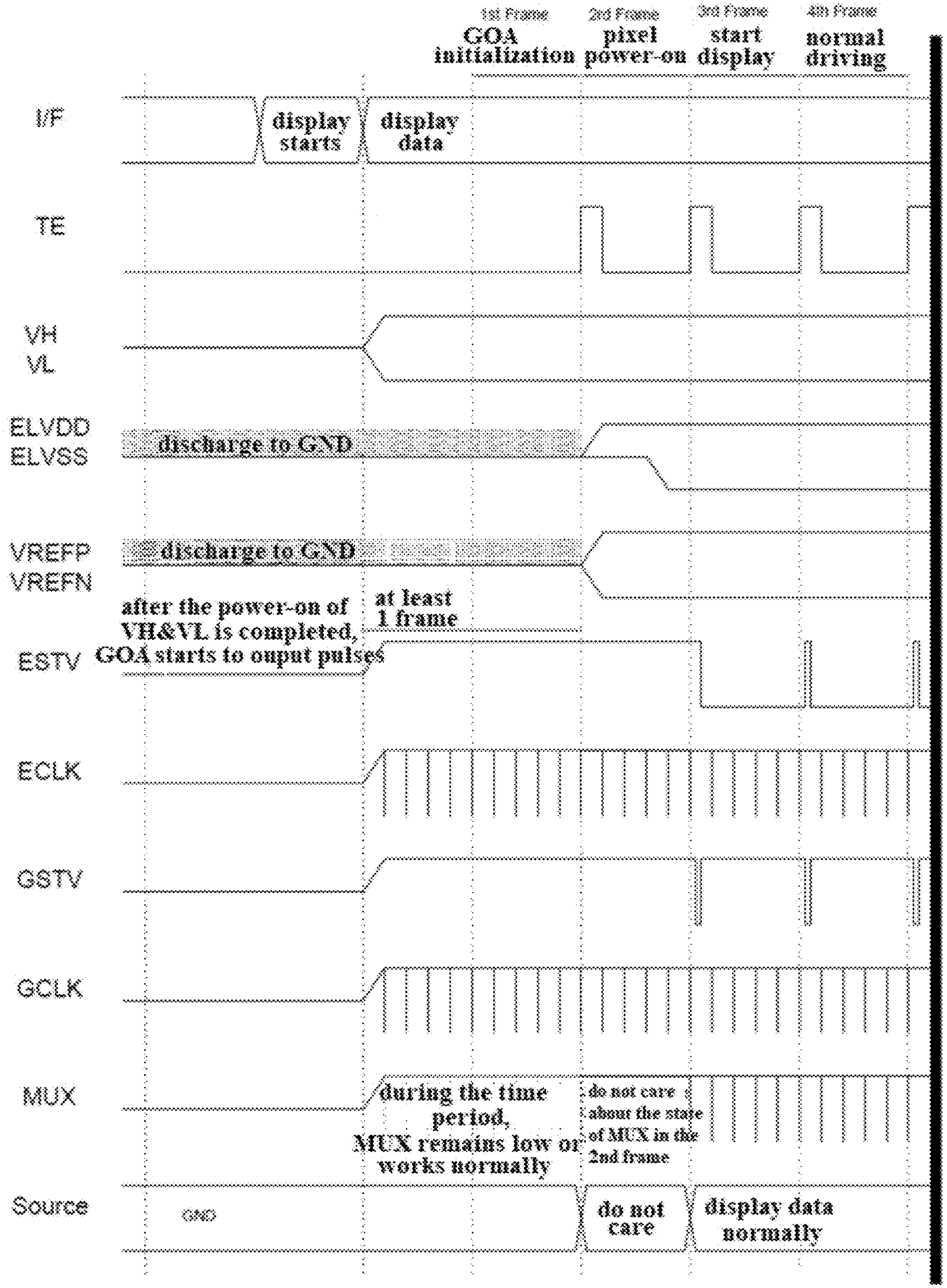

FIG. 7(*a*) is a circuit diagram of another exemplary pixel unit. FIG. 7(*b*) is an exemplary timing sequence diagram of the pixel unit in FIG. 7(*a*).

The pixel unit shown in FIG. 7(*a*) may include a forty-first transistor T41 to a forty-seventh transistor T47 and a forty-first capacitor C41. In addition, explanation will be given by taking the pixel unit being located in the Nth line as an example.

The control electrode of the forty-first transistor T41 is used to input the reset signal Reset (N), the first electrode of the forty-first transistor T41 is coupled to the first reference power terminal VREFN, and the second electrode of the forty-first transistor T41 is coupled to the first electrode of the forty-second transistor T42 and the control electrode of the forty-third transistor T43. The control electrode of the forty-second transistor T42 is used to input the gate driving signal Gate, and the second electrode of the forty-second transistor T42 is coupled to the second electrode of the forty-third transistor T43 and the first electrode of the forty-sixth transistor T46. The first electrode of the forty-third transistor T43 is coupled to the second electrode of the forty-seventh transistor T47 and a power terminal for inputting the first driving power supply ELVDD. The control electrode of the forty-fourth transistor T44 is used to input the gate driving signal Gate, the first electrode of the forty-fourth transistor T44 is used to input the display data signal Vdata, and the second electrode of the forty-fourth transistor T44 is coupled to the first electrode of the forty-fifth transistor T45 and the first electrode of the forty-seventh transistor T47. The control electrode of the forty-fifth transistor T45 is used to input the light-emitting control signal EM, and the second electrode of the forty-fifth transistor T45 is coupled to the second reference power terminal VREFP (which is also called the initialization power terminal, and can be input with high level). The control electrode of the forty-sixth transistor T46 is used to input the light-emitting control signal EM, and the second electrode of the forty-sixth transistor T46 is coupled to the first electrode of the OLED. The control electrode of the forty-seventh transistor T47 is used to input the reset signal Reset(N). The second electrode (which may be a cathode) of the OLED is coupled to the power terminal for inputting the second driving power supply ELVSS (which may be an input with low level). The first terminal of the forty-first capacitor C41 is coupled to the second electrode of the forty-fourth transistor T44, and the second terminal of the forty-first capacitor C41 is coupled to the second electrode of the forty-first transistor T41.

The working timing sequence of FIG. 7(*b*) can be exactly the same as that of FIG. 4(*b*), and the description thereof is omitted.

In the above, explanation is given by taking all the transistors being P-type (or called P-channel) transistors and the corresponding valid signal being a signal of a relatively low level (e.g., 0V or a negative voltage) as an example. It should be understood that some or all of the transistors can also be replaced with N-type without changing the overall function of the circuit, and the valid signal corresponding to the replaced part or all of the transistors will be at a signal of a relatively high level (for example, a positive voltage with a predetermined amplitude).

Depending on the specific structure of the applied OLED panel, the method shown in FIG. 2 may have additional steps, or each step in FIG. 2 may have further details.

FIG. 8(*a*) is a flowchart showing sub-steps of the method shown in FIG. 2.

As shown in FIG. 8(*a*), in embodiments of the present disclosure, during the first time period, the method for driving the gate driving circuit includes: step S1011, supplying power to the power terminal of the gate driving circuit (for example, providing a third power signal and a fourth power signal); step S1012, providing a clock signal to the gate driving circuit; and step S1013, providing an invalid first start signal to the gate driving circuit.

In embodiments of the present disclosure, the pixel circuit includes a driving power terminal and a reference power terminal. During the second time period, the method for driving the pixel circuit includes: step S1021, supplying power to the driving power terminal (e.g., providing a first power signal and a second power signal); and step S1022, supplying power to the reference power terminal.

FIG. 8(*b*) is a flowchart showing additional steps of the method shown in FIG. 2.

As shown in FIG. 8(*b*), in embodiments of the present disclosure, when the display panel further includes a light-emitting control driving circuit for outputting a light-emitting control signal to the pixel circuit, the method for driving the display panel further includes: step S104, during the first time period, driving the light-emitting control driving circuit.

In embodiments of the present disclosure, during the first time period, the method for driving the light-emitting control driving circuit may include: step S1041, supplying power to the power terminal of the light-emitting control driving circuit (for example, providing a third power signal and a fourth power signal); step S1042, providing a clock signal to the light-emitting control driving circuit; and step S1043, providing an invalid second start signal to the light-emitting control driving circuit.

FIG. 8(*c*) is a flowchart showing additional steps of the method shown in FIG. 2.

In embodiments of the present disclosure, the method for driving a display panel further includes: step S105, during a third time period, causing the source driving circuit provide a display data signal to the pixel circuit. During the first time period and the second time period, the first start signal and the second start signal remain invalid. During the third time period, the second start signal remains invalid until the first start signal of the gate driving circuit becomes valid.

FIG. 8(*d*) is an exemplary timing sequence diagram corresponding to a method for driving a display panel according to embodiments of the present disclosure.

As shown in FIG. 8(*d*), the first time period may include at least the first frame, $1^{st}$ frame.

In the first frame, power is provided to the power terminal of the gate driving circuit, and two supply voltages VH and VL are provided (for example, a high level and a low level can be provided respectively). The clock signal GCLK provided to the gate driving circuit may represent the above-mentioned first clock signal GCK and second clock signal GCB. An invalid first start signal GSTV is provided to the gate driving circuit.

In embodiments of the present disclosure, during the first time period and the second time period, the first start signal may remain invalid.

As shown in FIG. 8(*d*), the second time period may include at least the second frame, $2^{nd}$ frame. In both the first frame and the second frame, the first start signal GSTV may remain invalid.

Specifically, as shown in FIG. 8(*d*), the time from power-on to the display of the OLED panel can be roughly divided into the following stages.

1. After the OLED panel receives a Display on command via an interface (I/F), the GOA power supply VH and VL are powered on. Except for GOA input signals (STV, CLK) (ESTV and GSTV can be collectively referred to as STV; ECLK and GCLK can be collectively referred to as CLK) which are determined to output a high level or low level according to the specific GOA circuit design, other power supplies and signals of the panel remain a state outputting GND, to prevent current from appearing in the short circuit that may be formed by the pixel circuit during the power-on process;
2. It enters to the GOA initialization frame during the first time period in the above power-on method, the power supplies VH and VL of the gate driving circuit and/or the light-emitting control driving circuit (hereinafter referred to as GOA) are powered on, and one frame of time is used to initialize the driving circuit;

① In the pixel circuit, except for T3 shown in FIG. 4(*a*) and FIG. 7(*a*), the gate control of each transistor needs to be completed by GOA, so the GOA needs to be operated first when the panel is powered on;

② GOA is a multi-stage cascade structure, wherein the output of the previous stage is the input of the subsequent stage, and the output state of each stage is uncertain (possible output state: VH, VL or even a certain voltage between VH and VL) after the GOA is powered on, and as a result, the transistors in the pixel circuit may be in an unexpected turn-on state. If the power supply (VREFN, ELVDD, ELVSS) related to the pixel circuit is powered on, and/or the display data signal (Source) is provided without additional operation, a passage may be formed between different power supplies to cause a short circuit. Even more, if a current flows through the OLED device at that time, there will be a momentary screen flicker phenomenon. Therefore, at the beginning of the GOA power-on, the states of all stages of the GOA need to be determined; since the GOA stages are connected in cascade, the operation of determining the output states of the various stages requires a refresh period of one frame of image.

In embodiments of the present disclosure, during the first time period, the multiplexing circuit may remain on or switch normally (i.e., the Mux outputs a low level or normally outputs an alternating high and low level). Alternatively, when the source driving circuit outputs a ground signal, the multiplexing circuit may be kept on.

In the GOA initialization frame, the signal outputted from the source driving circuit to the pixel circuit in this frame may be a ground signal GND, and the switching signal Mux may output a low level or a normal output. Corresponding to the P-type transistor as a switch, it is turned on when outputting a low level, allowing the data signal to pass through. Normal output (toggle) refers to the output during normal display, the same as 4th Frame. Mux outputs a low level or a normal output, so that the GND output by the source driver can reach the pixel circuit, so that as many as possible lines and parts in the panel connected to the source driving circuit may be drained to GND. At this time, the voltages of ELVDD, ELVSS, VREFP, and VREFN are also GND, so most part in the pixel circuits are GND, and an uncontrollable current cannot be formed in the pixel circuit. At this time, it is better to output a low level, so that GND can be poured into the panel by the source driving circuit to prevent flickering. The first start signal GSTV and the second start signal ESTV output a high level (invalid), and the clock signal GCLK of the gate driving circuit and the clock signal ECLK of the light-emitting control driving circuit (which can represent the third clock signal ECK and the fourth clock signal ECB) are the same as the clock signals inputted to the gate driving circuit (Gate GOA) and the light-emitting control driving circuit (EM GOA) during normal display. After this frame is completed, for example, the gate states of all the TFTs of the pixel circuit in FIG. 4(*a*) except the thirteenth transistor T13 are in the high-level state (invalid), and the TFTs enter the off state.

3. It enters to the power-on frame of the pixel power during the second time period in the above power-on method, and the second start signal ESTV and the clock signal ECLK of the light-emitting control driving signal maintain the states in the GOA initialization frame. The first start signal GSTV of the gate driving signal and the clock signal GCLK maintain the state in the GOA initialization frame. In this frame, since the pixel circuit is not in the state of writing data, the voltage of the data signal Source and the state of the switching signal Mux in this frame may not be specified. If the power-on speed is too slow (the power-on time is late or the rise time is long), the frame can be changed from one frame to multiple frames to wait for the power-on to complete.

At this time, the gate state of each transistor (e.g., TFT) of the pixel circuit is determined, and the power supply related to the pixel circuit can be powered on. The pixel power supplies ELVDD, ELVSS, and VREFN are powered on (in some pixel circuits, the pixel power supply VREFP are powered on together). The source driver for providing display data (the output thereof is represented as Source) can also start to work, but does not necessarily provide data signals for normal display to the pixel circuit.

4. It enters to the start display frame, and the panel starts to display from this frame. The first start signal GSTV and the clock signal GCLK of the gate driving signal, the clock signal ECLK of the light-emitting control driving signal, the switching signal Mux and the data signal Source can be output normally.

In addition, the pixel circuit has not been written with a data signal in the previous frame, and therefore, the light-emitting control EM of the pixel circuit cannot be pulled down (valid) at the beginning of this frame, otherwise flickering may occur. Therefore, the second start signal ESTV of the light-emitting control driving signal needs to be kept at a high level (invalid) at the beginning of this frame, until a position that the second start signal ESTV is pulled down in a display frame during normal display, the second start signal ESTV is pulled down. That is, during normal display, the second start signal ESTV is at low level for two periods of time in one frame. But in this frame, in the first period of low level the second start signal ESTV needs to be pulled up, and in the second time period it is pulled down.

5. After the power-on is completed, the panel displays normally.

In addition, since the width of the low level of the first start signal GSTV is very narrow, if the first start signal GSTV and the clock signal GCLK of the gate driving circuit work normally, at the end of the display image of one display frame, the gate driving signals Gate of all lines in the panel are at a high level (same as the state of the gate driving signals Gate of all lines in the panel at the end of one frame of image when the first start signal GSTV is always pulled up and the clock signal GCLK works normally). Therefore, the working state of the first start signal GSTV in the GOA initialization frame can also be the same as the state during normal display, that is, the same as the fourth frame, 4th frame.

Figure 9:
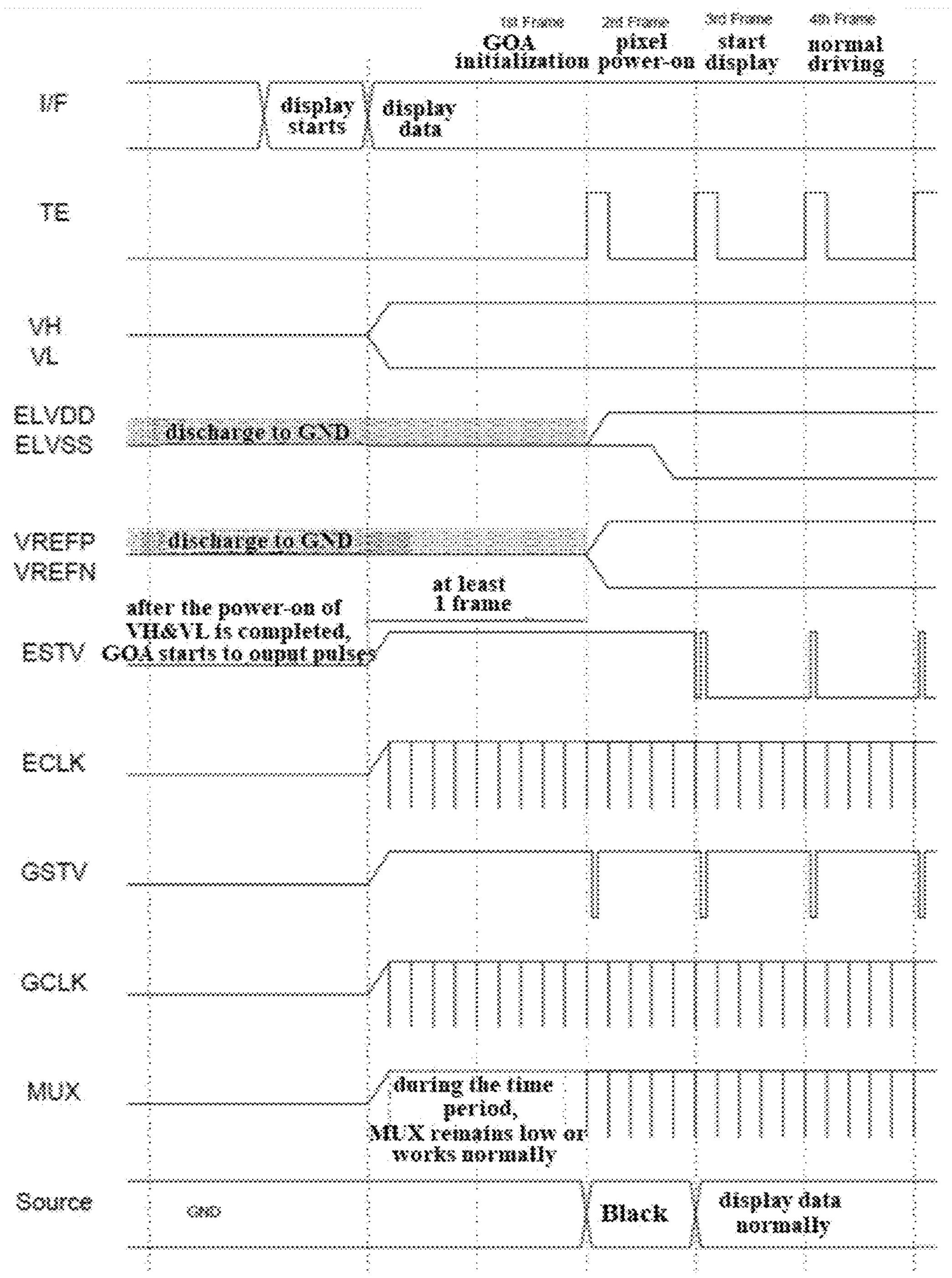
FIG. 9 is another exemplary timing sequence diagram corresponding to a method for driving a display panel according to embodiments of the present disclosure.

FIG. 9 is another exemplary timing sequence diagram corresponding to a method for driving a display panel according to embodiments of the present disclosure.

In embodiments of the present disclosure, during the first time period, the first start signal and the second start signal remain invalid. During the second time period, the second start signal remains invalid.

In embodiments of the present disclosure, during the second time period, the pixel circuit is provided with a display data signal corresponding to displaying black.

As shown in FIG. 9, both the power-on of the OLED panel and the GOA initialization frame can be the same as those shown in FIG. 8(*d*).

In the pixel power-on frame (2nd frame), the main difference from that shown in FIG. 8 is that the first start signal GSTV of the gate driving circuit can be in the same state as in normal display, with a stage of being pulled down (valid). That is, it is possible to cause the display data signal to be written to the pixel circuit.

Correspondingly, considering each power supply voltage of the pixel circuits during the power-on process, the written display data signal can be configured to be a voltage that can turn off the thirteenth transistor T13 (for example, corresponding to displaying black). It can also prevent screen flickering, short-circuiting, etc.

If the power-on speed is too slow (the power-on time is late or the rise time is long), the frame can be changed from one frame to multiple frames to wait for the power-on to complete.

In addition, at the beginning of entering the display frame, that is, the third frame (3rd frame), unlike FIG. 8(*d*), since the pixel circuit has been written with display data (such as black) in the previous frame, at the beginning of this frame, the write control signal EM of the pixel circuit can be pulled down (valid) normally, that is, the second start signal ESTV of the write control driving circuit can also work normally.

In addition, as in FIG. 8(*d*), the working state of the first start signal GSTV in the GOA initialization frame may be the same as the state during normal display, that is, the same as the 4th frame or the like.

In addition, since there is a situation that the first start signal GSTV of the gate driving circuit is pulled down in the pixel power-on frame (2nd frame), the voltage of the display data signal Source will be written, and black data is forced to be written. Therefore, the clock signal GCLK of the gate driving circuit can work normally in this frame (same as the 4th frame), but it can also not work (for example, depending on different composition of the gate driving circuit, keep a high level or low level).

Figure 10:
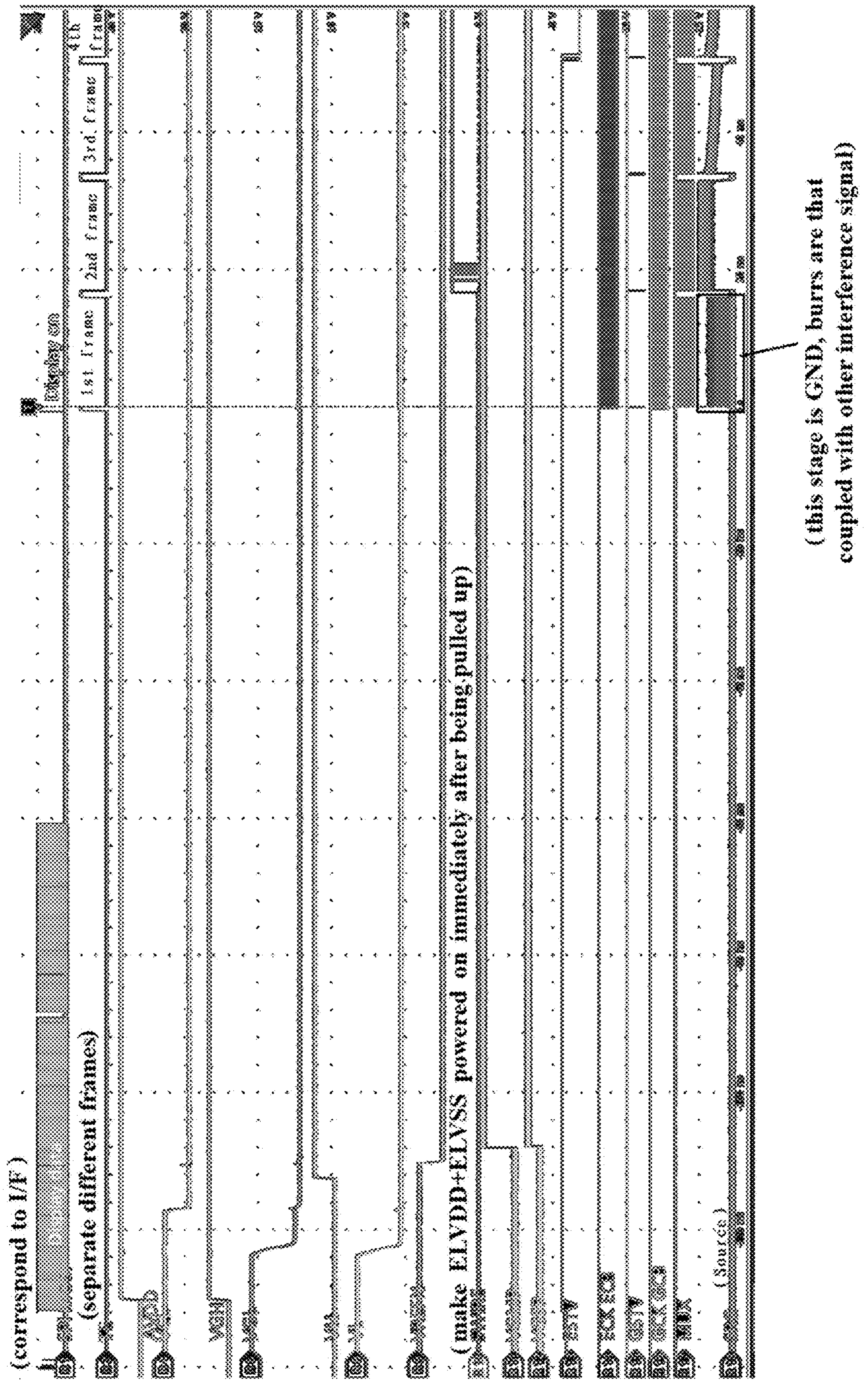
FIG. 10 is an exemplary test signal waveform diagram corresponding to a method for driving a display panel according to embodiments of the present disclosure.

FIG. 10 is an exemplary test signal waveform diagram corresponding to a method for driving a display panel according to embodiments of the present disclosure.

Specifically, FIG. 10 may correspond to the power-on timing shown in FIG. 9. SPIMOSI in FIG. 10 corresponds to I/F. The falling edge of TE indicates the beginning of a new frame, and the rising edge indicates the end of the previous frame. SWIRE in FIG. 10 is a signal for supplying the first driving power ELVDD and the second driving power ELVSS to the pixel circuit. Once SWIRE is pulled up, the first driving power ELVDD and the second driving power ELVSS start to supply power immediately.

As can be seen in FIG. 10, the display data signal SRC (i.e., source) may be coupled with an interference signal in the first frame, resulting in voltage fluctuations (burrs), and if the display process is directly started at this time, it may cause the screen to flicker, etc. According to embodiments of the present disclosure, in the first frame, $1^{st}$ frame, the gate driving circuit and the like are initialized instead of displaying, which can effectively avoid the occurrence of such a phenomenon.

After the initialization and power-on processes are completed, for example, in the fourth frame in FIG. 10, the normal display process starts, and the ESTV and other start signals can be output normally.

In addition, considering the practical application environment and requirements, "no power supply to the pixel circuit" described in the present disclosure may also refer to the case where the pixel circuit is not fully powered, that is, partially powered. For example, in FIG. 10, due to the actual application of the chip in the test object, etc., the first reference power terminal VREFN may be in a powered-on state in the first frame. This partial power supply setting can also play a certain role in avoiding the flickering of the display screen or the short circuit caused by the unstable state of the internal circuit of the display panel. Of course, the case where no power is provided to the pixel circuit in the first frame will be a more preferred embodiment.

Figure 11:
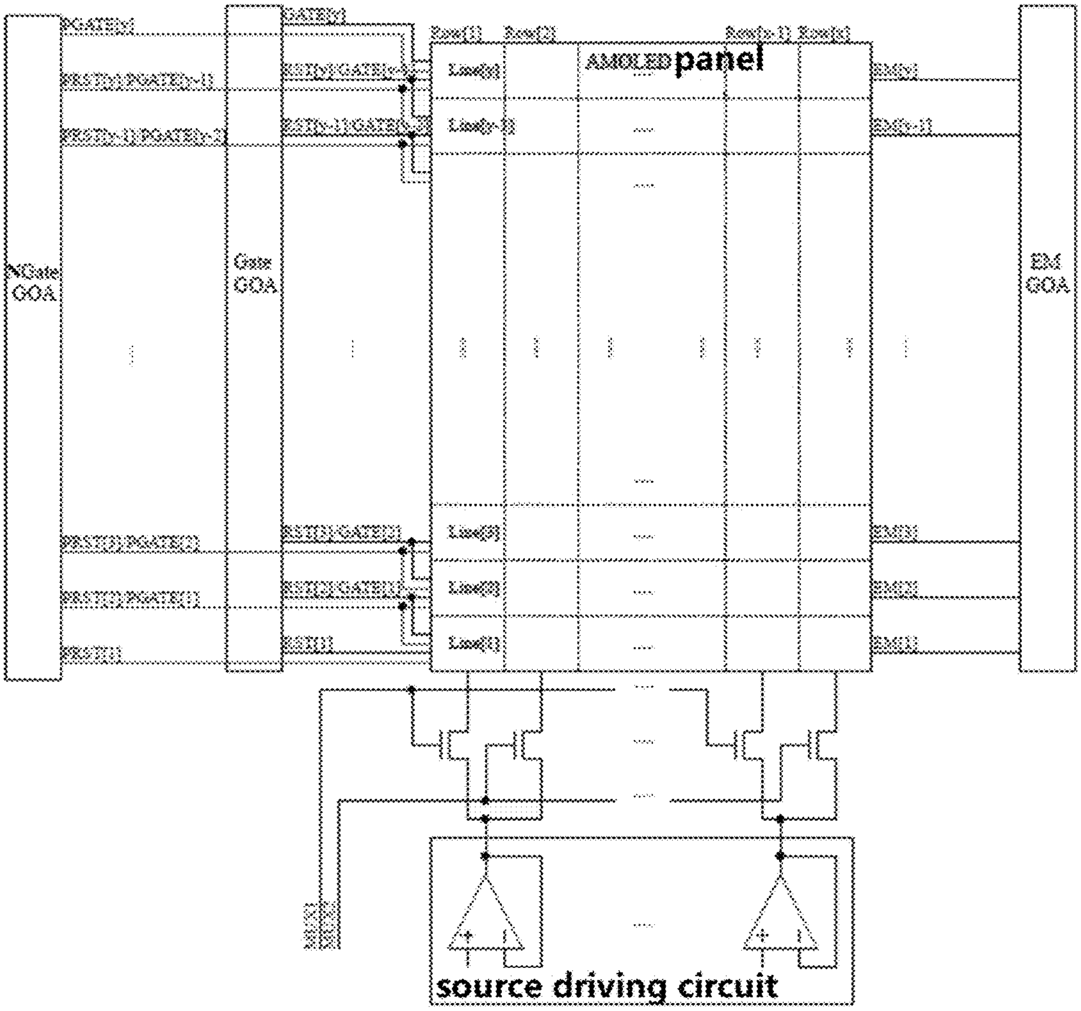
FIG. 11 is a block diagram showing the structure of another exemplary OLED display panel.

FIG. 11 is a block diagram showing the structure of another exemplary OLED display panel.

The structure in FIG. 11 can be used for LTPO (Low Temperature Polycrystalline Oxide) AMOLED panels. Compared with the LTPS AMOLED panel shown in FIG. 3, there is an additional gate driving circuit (NGate GOA). The gate driving circuit (NGate GOA) is used to provide the required additional gate driving signal NGATE and reset signal NRST to the pixel circuit.

Figure 12A:
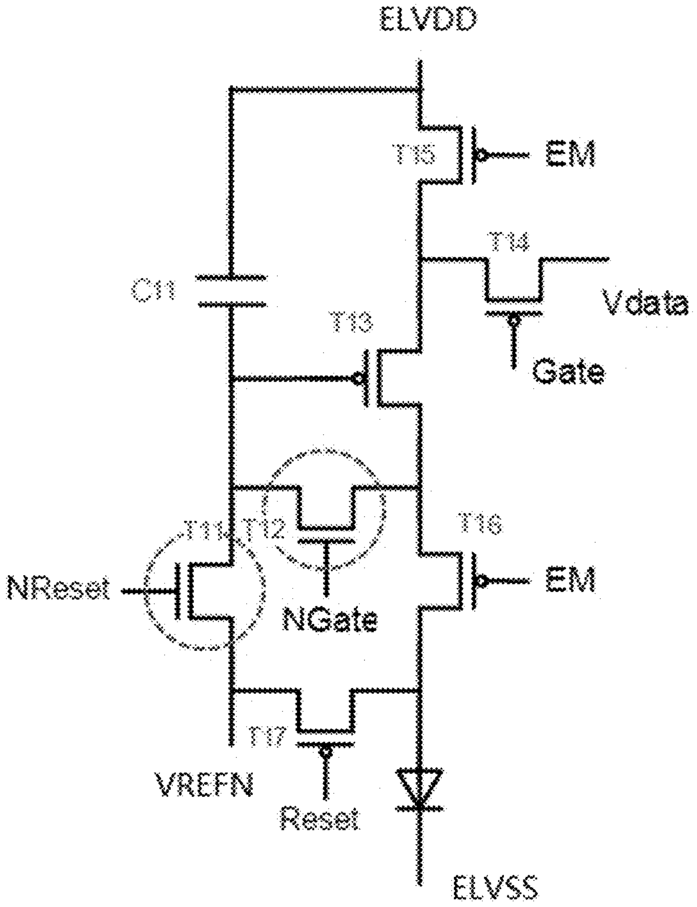
FIG. 12(*a*) is an exemplary circuit diagram of a pixel unit in FIG. 11.
Figure 12B:
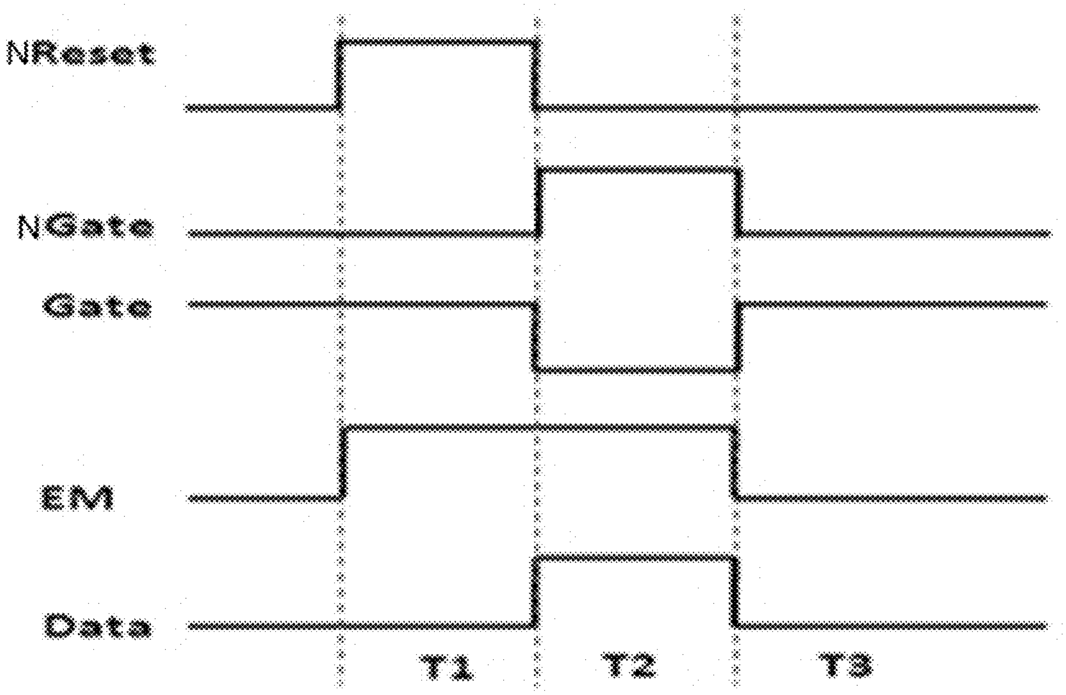

FIG. 12(*a*) is an exemplary circuit diagram of the pixel unit in FIG. 11. FIG. 12(*b*) is an exemplary timing sequence diagram of the pixel unit in FIG. 12(*a*).

The LTPO pixel circuit is shown in FIG. 12(*a*). Compared with FIG. 4, the eleventh transistor T11 and the twelfth transistor T12 are replaced by N-channel transistors (e.g., indium gallium zinc oxide thin film transistors, IGZO TFT), and these two TFTs are driven separately with an additional gate driving circuit (NGate GOA).

Specifically, in FIG. 12(*b*), during the time period T1, the required additional reset signal NReset is further provided. During the time period T2, the required additional gate driving signal NGate is further provided. That is, except that the polarity of the driving signals of the eleventh transistor T11 and the twelfth transistor T12 is changed, the remaining signals are in the same timings as those in FIG. 4(*b*).

Figure 13A:
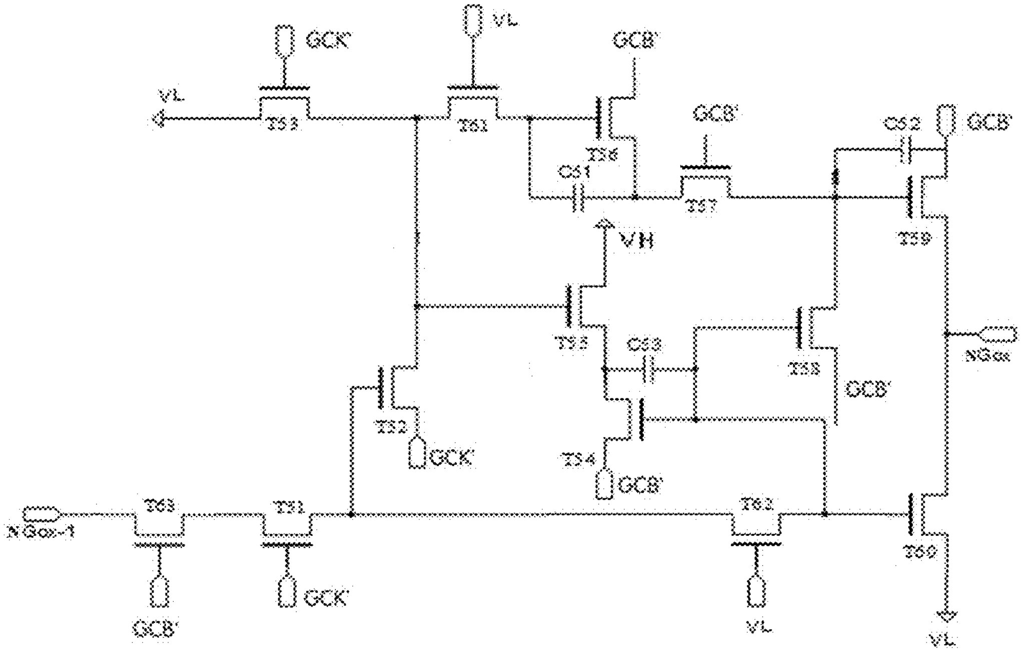
FIG. 13(*a*) is an exemplary circuit diagram of a additional gate driving circuit of FIG. 11.
Figure 13B:
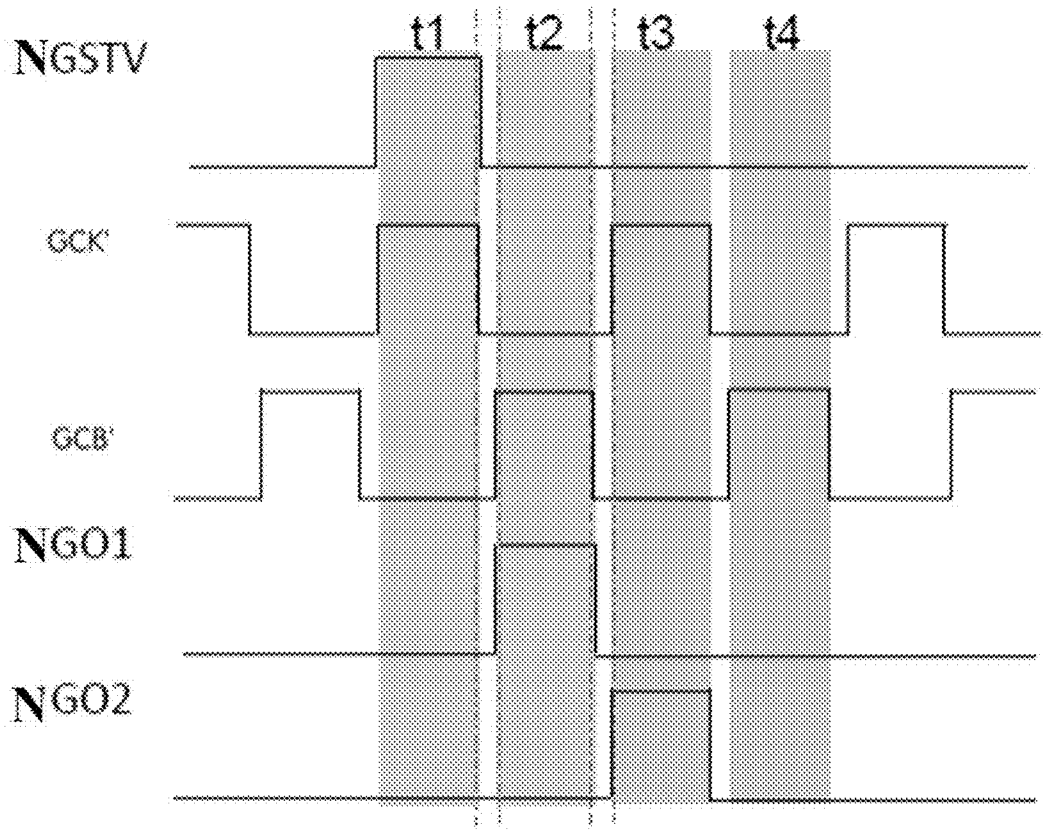

FIG. 13(*a*) is an exemplary circuit diagram of the additional gate driving circuit of FIG. 11. FIG. 13(*b*) is an exemplary timing sequence diagram of the additional gate driving circuit of FIG. 13(*a*).

As shown in FIG. 13(*a*), as a non-limiting example, the shift register unit of such an additional gate driving circuit may include: the fifty-first transistor T51 to the sixty-third transistor T63, and the fifty-first capacitor C51 to the fifty-third capacitor C53. The control electrode of the fifty-first transistor T51 is used to input the fifth clock signal GCK', the first electrode of the fifty-first transistor T51 is coupled to the second electrode of the sixty-third transistor T63, and the second electrode of the fifty-first transistor T51 is coupled to the control electrode of the fifty-second transistor T52 and the first electrode of the sixty-second transistor T62. The first electrode of the fifty-second transistor T52 is used to input the fifth clock signal GCK', and the second electrode of the fifty-second transistor T52 is coupled to the second electrode of the fifty-third transistor T53, the control electrode of the fifty-fifth transistor T55, and the first electrode of the sixty-first transistor T61. The control electrode of the fifty-third transistor T53 is used to input the fifth clock signal GCK', and the first electrode of the fifty-third transistor T53 is coupled to the power terminal for inputting the low level VL. The control electrode of the fifty-fourth transistor T54 is coupled to the control electrode of the fifty-eighth transistor T58, the control electrode of the sixtieth transistor T60, and the second electrode of the sixty-second transistor T62, and the first electrode of the fifty-fourth transistor T54 is used to input the sixth clock signal GCB', and the second electrode of the fifty-fourth transistor T54 is coupled to the second electrode of the fifty-fifth transistor T55. The first electrode of the fifty-fifth transistor T55 is coupled to the power terminal for inputting the high level VH. The control electrode of the fifty-sixth transistor T56 is coupled to the second electrode of the sixty-first transistor T61, the first electrode of the fifty-sixth transistor T56 is used to input the sixth clock signal GCB', and the second electrode of the fifty-sixth transistor T56 is coupled to the first electrode of the fifty-seventh transistor T57. The control electrode of the fifty-seventh transistor T57 is used to input the sixth clock signal GCB', and the second electrode of the fifty-seventh transistor T57 is coupled to the first electrode of the fifty-eighth transistor T58 and the control electrode of the fifty-ninth transistor T59. The second electrode of the fifty-eighth transistor T58 is used to input the sixth clock signal GCB'. The first electrode of the fifty-ninth transistor T59 is used to input the sixth clock signal GCB', and the second electrode of the fifty-ninth transistor T59 is coupled to the first electrode of the sixtieth transistor T60, and is used to output an auxiliary gate driving signal NGox (x can represent the number of lines). The second electrode of the sixtieth transistor T60 is coupled to the power terminal for inputting the low level VL. The control electrode of the sixty-first transistor T61 is coupled to the power terminal for inputting the low level VL. The control electrode of the sixty-second transistor T62 is coupled to the power terminal for inputting the low level VL. The control electrode of the sixty-third transistor T63 is used to input the sixth clock signal GCB', and the first electrode of the sixty-third transistor T63 is coupled to the auxiliary gate driving signal NGox−1 (x may represent the number of lines) outputted by the previous line.

The fifty-first capacitor C51 is coupled between the control electrode and the second electrode of the fifty-sixth transistor T56. The fifty-second capacitor C52 is coupled between the control electrode and the first electrode of the fifty-ninth transistor T59. The fifty-third capacitor C53 is coupled between the control electrode and the second electrode of the fifty-fourth transistor T54.

The timing of FIG. 13(*b*) differs from that of FIG. 5(*b*) in that the start signal NGSTV and the additional gate driving signal NGO (including the NGO1 in the first line and NGO2 in the second line) of the additional gate driving circuit in FIG. 13(*b*) are valid at a high level. In addition, the levels of the fifth clock signal GCK' and the sixth clock signal GCB' in FIG. 13(*b*) are adjusted accordingly.

Figure 14:
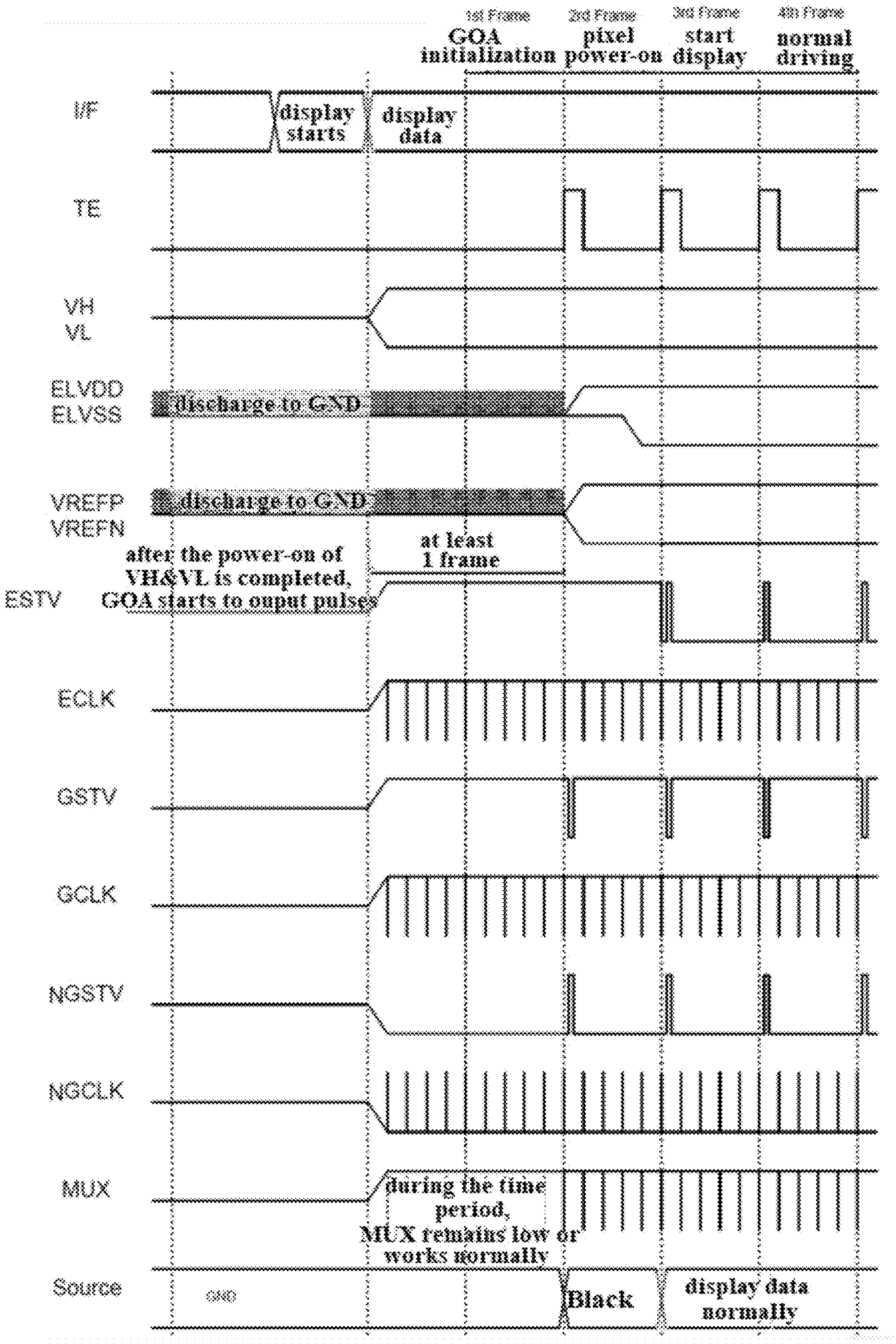
FIG. 14 is an exemplary timing sequence diagram corresponding to a method for powering on the OLED display panel of FIG. 11 according to embodiments of the present disclosure.

FIG. 14 is an exemplary timing sequence diagram corresponding to a method for powering on the OLED display panel of FIG. 11 according to embodiments of the present disclosure.

As shown in FIG. 14, except that the start signal NGSTV and the clock signal NGCLK of the additional gate driving circuit need to be provided as the polarity of the driving signals of the eleventh transistor T11 and the twelfth transistor T12 in the pixel circuit is changed, there are no other differences from the timing shown in FIG. 9. In addition, the start signal NGSTV and the clock signal NGCLK of the additional gate driving circuit may be reversed to the start signal GSTV and the clock signal GCLK of the gate driving circuit, respectively. That is, during each time period, when the start signal GSTV of the gate driving circuit is valid, the start signal NGSTV of the additional gate driving circuit is also in a valid state.

Figure 15:
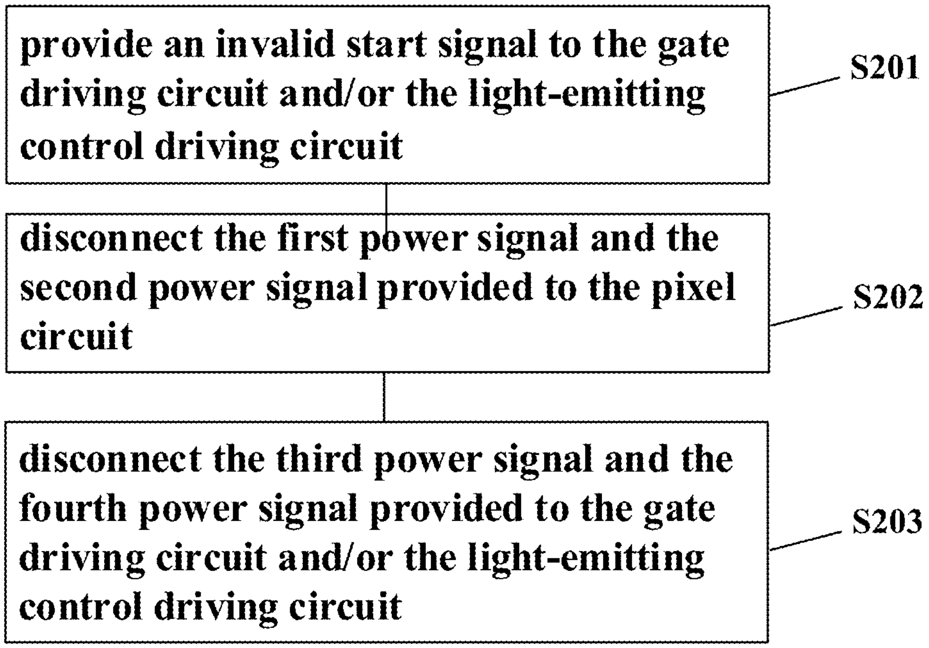
FIG. 15 is another exemplary flowchart illustrating a method for driving a display panel according to embodiments of the present disclosure.

FIG. 15 is another exemplary flowchart illustrating a method for driving a display panel according to embodiments of the present disclosure. The display panel in embodiments of the present disclosure can also be driven by this method.

The method for driving a display panel shown in FIG. 15 may include: step S201, during the fourth time period, providing an invalid start signal to the gate driving circuit and/or the light-emitting control driving circuit; step S202, during the fifth time period, disconnecting the first power signal and the second power signal provided to the pixel circuit; step S203, during the sixth time period, disconnecting the third power signal and the fourth power signal provided to the gate driving circuit and/or the light-emitting control driving circuit.

According to embodiments of the present disclosure, in the process of powering off the display panel, operations such as the stopping of the driving of the gate driving circuit and/or the light-emitting control driving circuit, the disconnection of the power supply of the pixel circuit, and the disconnection of the power supply of the gate driving circuit and/or the light-emitting control driving circuit are performed during different periods of time. In this way, the transistor in the pixel circuit can be prevented from being powered off when the state of the transistor is unstable, thereby effectively preventing problems such as flickering of the display screen or short circuiting.

In embodiments of the present disclosure, the fourth time period and the fifth time period do not overlap. According to this method, it can be ensured that the gate driving circuit turns off the corresponding circuit elements (e.g., transistors) in the pixel circuit according to the predetermined timing sequence for display, and then disconnects the power supply of the pixel circuit. This can more effectively prevent the display screen from flickering, or the short-circuiting.

In embodiments of the present disclosure, the fourth time period includes the time duration of at least one display frame. Since the matrix of pixel circuits is scanned line by line, it takes at least one frame time to reliably turn off corresponding circuit elements in all pixel circuits.

In embodiments of the present disclosure, during the fourth time period, an invalid start signal is provided to the light-emitting control driving circuit. According to embodiments of the present disclosure, after an invalid start signal is provided to the light-emitting control driving circuit, the light-emitting control driving circuit cannot output a valid control signal to the pixel circuit. The control element in the pixel circuit related to the light-emitting process of the light-emitting element is closed/turned off. For example, the control element may be a transistor for switching on/off the current flowing through the light-emitting element.

According to embodiments of the present disclosure, during the power-off process of the display panel, the light-emitting element will not emit light regardless of whether the gate driving circuit is working or not.

In embodiments of the present disclosure, during the fourth time period, a valid start signal is provided to the gate driving circuit; and during the fourth time period, the pixel circuit is provided with a display data signal corresponding to displaying black.

According to embodiments of the present disclosure, a display data signal corresponding to displaying black can be written into the pixel circuit, preventing the previously written data signal or other interference from still being stored in the pixel circuit. Thereby, problems such as flickering can be further prevented. This may be the more preferred solution.

In addition, in embodiments of the present disclosure, it may also be that, during the fourth time period, an invalid start signal is provided to the gate driving circuit. According to embodiments of the present disclosure, it will be impossible to write a display data signal to the pixel circuit. Therefore, during the power-off process of the display panel, the specific state of the display data signal may be regardless.

In embodiments of the present disclosure, during the fifth time period, the gate driving circuit and the light-emitting control driving circuit are provided with an invalid start signal. According to embodiments of the present disclosure, during the fifth time period, the state in which the related control elements in the pixel circuit are closed/turned off can be maintained.

In embodiments of the present disclosure, the pixel circuit includes a driving power terminal and a reference power terminal. During the fifth time period, the driving power terminal and the reference power terminal are grounded; and, during the fifth time period, the source driving circuit outputs a ground signal. According to embodiments of the present disclosure, during the fifth time period, each power terminal and input terminal (e.g., a display data signal input terminal connected to the source driving circuit) of the pixel circuit may also be grounded. This can prevent the voltages stored by the filter capacitors, parasitic capacitors, etc. on these power terminals and input terminals from being not able to be released and thereby affecting the power-off speed of the display panel.

In embodiments of the present disclosure, during the sixth time period, the power terminal of the gate driving circuit and/or the light-emitting control driving circuit is grounded. According to embodiments of the present disclosure, once the power-off of the pixel circuit is completed, the power signal of the gate driving circuit and/or the light-emitting control driving circuit can be disconnected as soon as possible, and the power terminal of the gate driving circuit and/or the light-emitting control driving circuit can be further grounded to complete the power-off process of the entire display panel.

Figure 16:
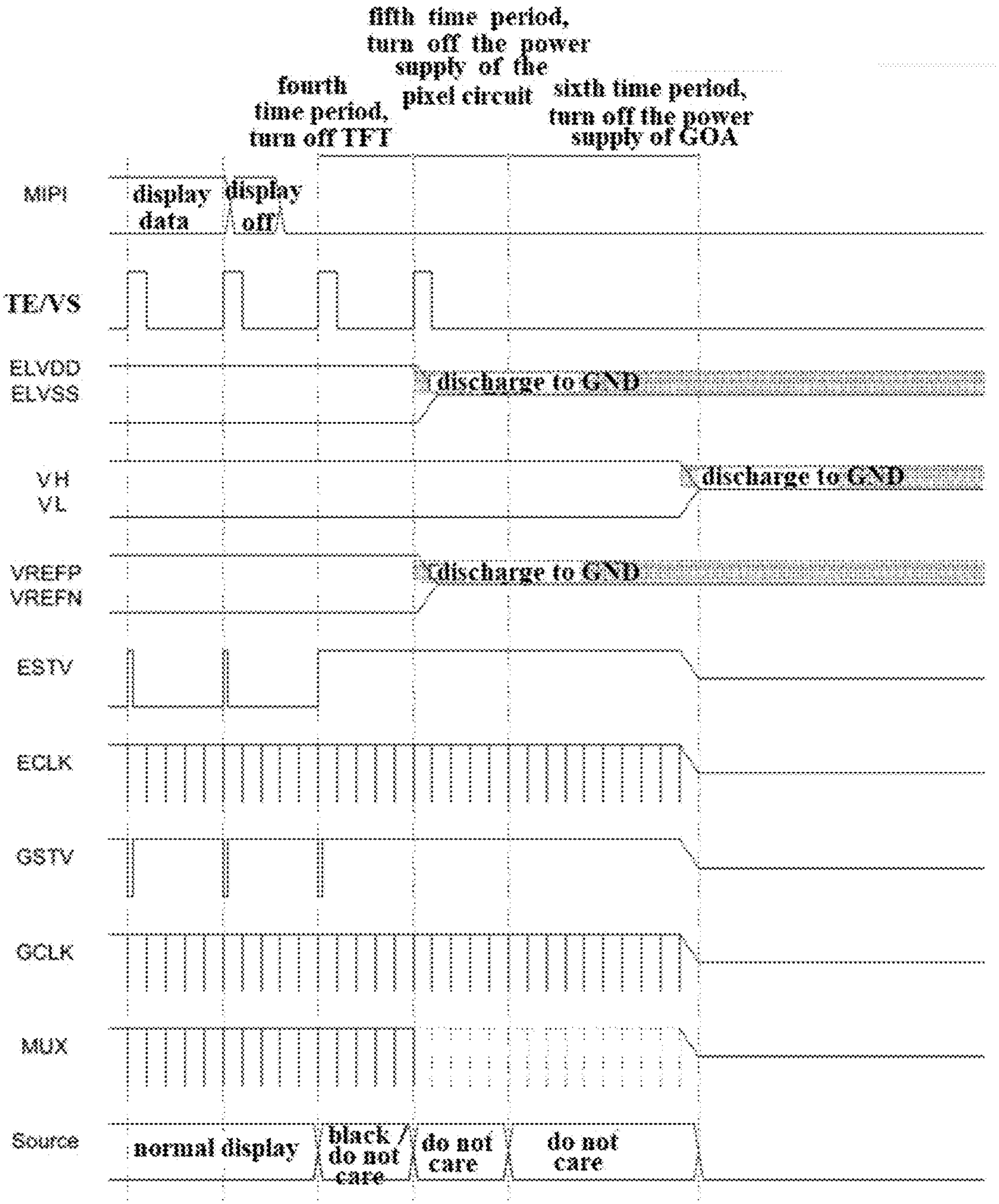
FIG. 16 is an exemplary timing sequence diagram corresponding to the method for driving a display panel shown in FIG. 15 according to embodiments of the present disclosure.

FIG. 16 is an exemplary timing sequence diagram corresponding to the method for driving a display panel shown in FIG. 15 according to embodiments of the present disclosure.

As an example, the timing can also be applied to the AMOLED panel shown in FIG. 3, and the panel can contain various circuit structures as shown in FIG. 4(*a*), FIG. 5(*a*), and FIG. 6(*a*). Alternatively, the panel may also include the circuit structure shown in FIG. 7(*a*).

As shown in FIG. 16, the time from the normal display of the OLED panel to the shutdown can be roughly divided into the following stages.

In embodiments of the present disclosure, after receiving a Display off command, the time of one display frame may be used to turn off a light-emitting control element (e.g., a transistor TFT) in the pixel circuit. This is because the display brightness of the AMOLED display panel is related to many voltages, and the power-off of each voltage is not completed in an instant, but in a time duration of a ms level. If the power is turned off rashly, the display content of the display panel within the ms level time duration will be uncontrollable. A preferred method is to turn off each control element and related circuits in the pixel circuit, and then perform the power-off operation. The display panel mostly uses a cascaded driving circuit architecture (GOA), and it takes one frame to use the driving circuit to turn off the related elements in the pixel circuits of all lines.

Specifically, during the fourth time period, an invalid start signal is provided to the light-emitting control driving circuit. That is, during this time period, the second start signal ESTV is always in a high level (invalid) state corresponding to, for example, the type of transistors in the light-emitting control driving circuit shown in FIG. 6(*a*). In such a case, the light-emitting control driving circuit will not be able to output a predetermined valid light-emitting control signal (e.g., a level including a low level, or a transition between high and low) to the pixel circuit as shown in FIG. 6(*b*). EO1 may represent a light-emitting control signal output to the pixel circuits of the first line. EO2 may represent a light-emitting control signal output to the pixel circuits of the second line.

Referring to FIG. 4(*a*) and FIG. 4(*b*), when the light-emitting control signal (represented by EM) of the pixel circuit is invalid (always high), the fifteenth transistor T15 and the sixteenth transistor T16 are always turned off. During this time period, regardless of the state of the thirteenth transistor T13, current cannot flow through the OLED in the pixel circuit via the fifteenth transistor T15 and the sixteenth transistor T16, and the OLED cannot emit light.

At this time, the gate driving circuit may provide the first start signal GSTV which is invalid (always high) or normally valid (e.g., a level including a low level, or a transition between high and low).

As an example, during the fourth time period, a valid start signal is provided to the gate driving circuit, and a display data signal corresponding to displaying black is provided to the pixel circuit. Alternatively, it is also possible not to care about the specific state of the display data signal.

In addition, since the matrix of the pixel circuit is scanned line by line, the gate driving circuit (Gate GOA) and the emission control driving circuit (EM GOA) are respectively with a cascaded structure, and therefore, it may take at least one display frame time for the gate driving circuit (Gate GOA) and the light-emitting control driving circuit (EM GOA) to reliably turn off corresponding circuit elements in all pixel circuits.

When the related control elements in the pixel circuit have been turned off, the related power supplies (VREFN, ELVDD, ELVSS, Source) of the pixel circuit can be powered off. In order to maintain the off state of the control elements, the related control signal cannot be removed (e.g., the control signal applied to the gate of the transistor needs to maintain the related level).

Specifically, during the fifth time period, the power supplies related to the pixel circuit are powered off. At the end of the fourth time period, the corresponding circuit elements in all the pixel circuits (e.g., the respective transistors described above) have been already closed/turned off. This state continues to be maintained during the fifth time period, so the second start signal ESTV and the first start signal GSTV remain invalid (always high).

Referring to the unit of the gate driving circuit (Gate GOA) in FIG. 5(*a*), if the first start signal GSTV is always high, the gate driving circuit will not be able to output the predetermined valid (e.g., a level including a low level, or a transition between high and low) gate driving signal to the pixel circuit as shown in FIG. 5(*b*). GO1 may represent a gate driving signal output to the pixel circuits of the first line. GO2 may represent a gate driving signal output to the pixel circuits of the second line.

Referring to the pixel circuit of FIG. 4(*a*), since the gate driving signal Gate remains high at this stage, the data signal Data cannot be written into the storage element (e.g., the eleventh capacitor C11) in the pixel circuit. When the data signal cannot be written, the state of the switching signal MUX (for example, MUX1, MUX2) as shown in FIG. 3 and the state of the data signal Data itself may not be limited, which can further simplify the power-off control logic.

In the fifth time period, after the corresponding circuit elements (for example, the above-mentioned respective transistors) in all the pixel circuits have been closed/turned off, the power terminals of the pixel circuits (for example, for VREFN, ELVDD, ELVSS, etc.), and the input terminal (for example, for Source) is powered-off. In particular, they can be grounded to GND to prevent the voltages stored by the filter capacitors, parasitic capacitors, etc. on these power terminals and input terminals from being not able to be released thereby affecting the power-off speed of the display panel. After they discharge to GND, the fifth time period ends.

The power supply associated with the pixel circuit has been disconnected when the control element is closed/turned off, and at this time, even if the control element is started/turned on again, no current will flow through the control element and light the OLED device. At this time, the respective power sources of the driving circuits can be disconnected. At this point, the entire power-off process of the panel is completed.

Specifically, during the sixth time period, the power-off of the pixel circuit has been completed, and then the power-off of the driving circuit (e.g., the gate driving circuit, the light-emitting control driving circuit) can be started. At this stage, each driving circuit stops outputting the driving signal in the form of pulses. After the pulse output is stopped, the power supply of the driving circuit can be disconnected as soon as possible, and the power-off process is completed. In particular, the power terminal of the driving circuit may also be grounded.

It should be understood that, during the power-off process, the specific levels of the above-mentioned "valid" and "invalid" signals are still determined according to the specific circuit structure. For example, when different types of transistors are used to form pixel circuits, driving circuits, etc., a high level can also become a valid level.

Figure 17:
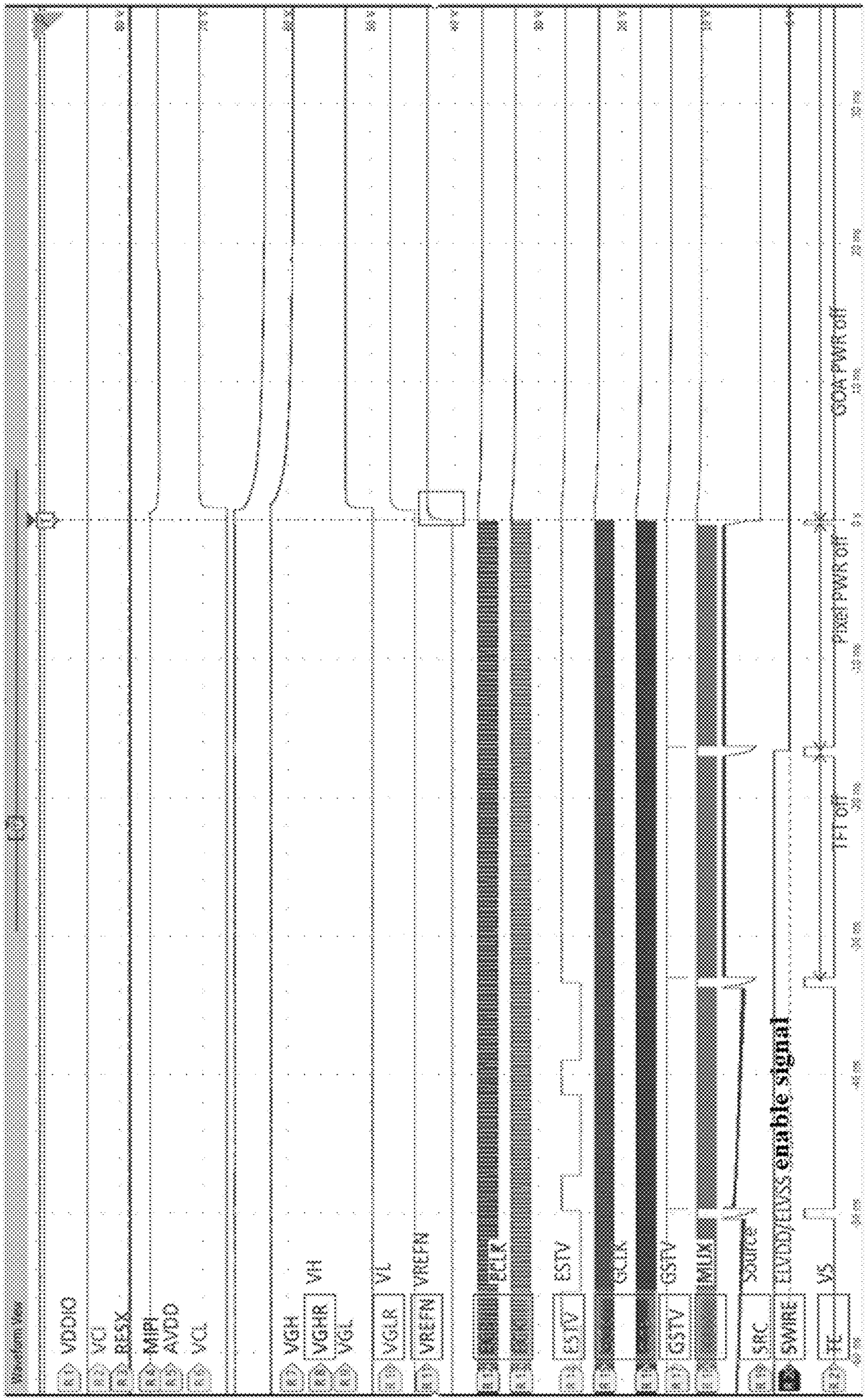
FIG. 17 is an exemplary test signal waveform diagram corresponding to the method for driving a display panel shown in FIG. 15 according to embodiments of the present disclosure.

FIG. 17 is an exemplary test signal waveform diagram corresponding to the method for driving a display panel shown in FIG. 15 according to embodiments of the present disclosure.

Specifically, FIG. 17 may correspond to the power-off timing shown in FIG. 16. The MIPI in FIG. 17 corresponds to the MIPI in FIG. 16, and this signal belongs to a kind of interface signal IF, and can indicate the start of the power-off process alone or together with other signals. The falling edge of TE/VS indicates the beginning of a new frame, and the rising edge indicates the end of the previous frame. SWIRE in FIG. 17 is a signal for supplying the first driving power ELVDD and the second driving power ELVSS to the pixel circuit. Once SWIRE is pulled up, the first driving power ELVDD and the second driving power ELVSS start to supply power immediately. Once SWIRE is low, the power supply of the first driving power supply ELVDD and the second driving power supply ELVSS is disconnected.

The above-mentioned fourth time period is represented by TFT off in FIG. 17, the above-mentioned fifth time period is represented by Pixel PWR off in FIG. 17, and the above-mentioned sixth time period is represented by GOA PWR off in FIG. 17.

Figure 18:
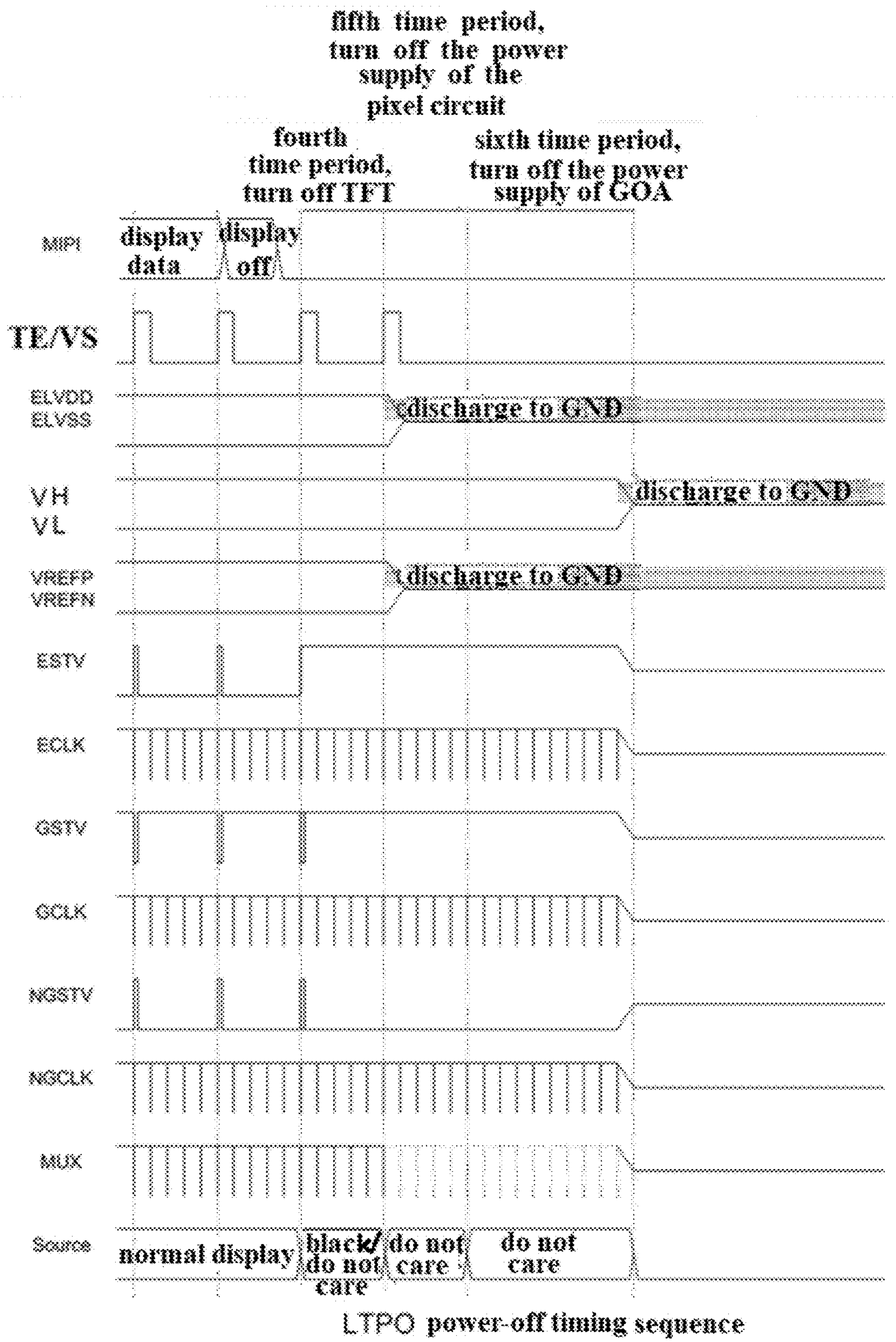
FIG. 18 is an exemplary timing sequence diagram corresponding to a method for powering off the OLED display panel of FIG. 11 according to embodiments of the present disclosure.

FIG. 18 is an exemplary timing sequence diagram corresponding to a method for powering the OLED display panel off of FIG. 11 according to embodiments of the present disclosure.

As shown in FIG. 18, except that the start signal NGSTV and the clock signal NGCLK of the additional gate driving circuit need to be provided as the polarity of the driving signals of the eleventh transistor T11 and the twelfth transistor T12 in the pixel circuit is changed, there are no other differences from the timing shown in FIG. 16. In each time period, when the start signal GSTV of the gate driving circuit is valid, and the start signal NGSTV of the additional gate driving circuit is also in a valid state.

According to embodiments of the present disclosure, an improved power-on timing is provided for the OLED display panel, which can avoid problems such as display screen flickering or short-circuiting caused by unstable internal circuit states of the display panel during the power-on process. Especially when the panel is powered on during a short time period (for example, two frames), problems such as a splash screen flicking and an internal short-circuiting can be avoided at the moment of power-on.

In addition, according to embodiments of the present disclosure, an improved power-off timing is also provided for the OLED display panel, which can avoid problems such as display screen flickering or short-circuiting caused by unstable internal circuit states of the display panel during the power-off process. Especially when the panel is powered off during a short time period (for example, it can be as short as two frames), it can avoid problems such as screen flicking and internal short-circuiting at the moment of power off.

It should be understood that the above are only exemplary embodiments of the present disclosure, and the protection scope of the present disclosure is not limited thereto, and the protection scope of the present disclosure should be subject to the protection scope of the claims.

What is claimed is:

1. An apparatus for driving a display panel, wherein the display panel comprises a pixel circuit, a gate driving circuit, a source driving circuit, and a light-emitting control driving circuit, wherein the gate driving circuit and the source driving circuit respectively provide scan signals, data signals, to the pixel circuit;

wherein the pixel circuit includes a plurality of pixel units in an array, and each pixel unit includes an OLED element;

wherein the light-emitting control driving circuit is for outputting a light-emitting control signal to the pixel circuit;

wherein the apparatus is configured to:

during a first time period, provide an invalid start signal to the gate driving circuit and/or the light-emitting control driving circuit;

during a second time period, provide a first power signal and a second power signal to the pixel circuit;

during a third time period, provide a valid start signal to the gate driving circuit and/or the light-emitting control driving circuit;

wherein the apparatus is further configured to: during the first time period, provide a third power signal and a fourth power signal to a power terminal of the gate driving circuit;

provide a clock signal to the gate driving circuit; and provide an invalid first start signal to the gate driving circuit.

2. The apparatus for driving a display panel according to claim 1, wherein during the first time period, a power terminal of the pixel circuit is grounded.

3. The apparatus for driving a display panel according to claim 1, wherein during the first time period, the source driving circuit is caused to output a ground signal.

4. The apparatus for driving a display panel according to claim 1, wherein the first start signal is kept invalid during the first time period and the second time period.

5. The apparatus for driving a display panel according to claim 1, further configured to:

during the third time period, cause the source driving circuit to provide a display data signal to the pixel circuit.

6. The apparatus for driving a display panel according to claim 1, wherein the apparatus is further configured to: during the first time period, drive the light-emitting control driving circuit.

7. The apparatus for driving a display panel according to claim 6, wherein the apparatus is further configured to: during the first time period, provide a third power signal and a fourth power signal to a power terminal of the light-emitting control driving circuit;

provide a clock signal to the light-emitting control driving circuit; and provide an invalid second start signal to the light-emitting control driving circuit.

8. The apparatus for driving a display panel according to claim 7, further configured to:

during the third time period, cause the source driving circuit to provide a display data signal to the pixel circuit;

wherein, during the first time period and the second time period, the first start signal provided to the gate driving circuit and the second start signal provided to the light-emitting control driving circuit remain invalid; and wherein, during the third time period, the second start signal remains invalid before the first start signal of the gate driving circuit becomes valid.

9. The apparatus for driving a display panel according to claim 7, wherein during the first time period, the first start signal provided to the gate driving circuit and the second start signal provided to the light-emitting control driving circuit remain invalid; and wherein during the second time period, the second start signal remains invalid.

10. The apparatus for driving a display panel according to claim 9, wherein during the second time period, a display data signal corresponding to displaying black is provided to the pixel circuit.

11. The apparatus for driving a display panel according to claim 1, wherein the pixel circuit comprises a driving power terminal and a reference power terminal;

the apparatus is further configured to, during the second time period, provide the first power signal and the second power signal to the driving power terminal, and supply power to the reference power terminal; and/or wherein the first time period comprises a time duration of at least one display frame, and the second time period comprises the time duration of at least one display frame; and/or wherein the first time period and the second time period do not overlap; and/or wherein the display panel further comprises a multiplexing circuit provided between the source driving circuit and the pixel circuit; wherein, when the source driving circuit is caused to output a ground signal, the multiplexing circuit is turned on.

12. A method for driving a display panel using the apparatus for driving a display panel according to claim 1.

13. A display panel, comprising: a pixel circuit, a gate driving circuit, a source driving circuit, and an apparatus for driving a display panel according to claim 1.

14. An apparatus for driving a display panel, wherein the display panel comprises a pixel circuit, a gate driving circuit, a source driving circuit, and a light-emitting control driving circuit, wherein the gate driving circuit and the source driving circuit respectively provide scan signals, data signals, to the pixel circuit;

wherein the pixel circuit includes a plurality of pixel units in an array, and each pixel unit includes an OLED element;

wherein the light-emitting control driving circuit is for outputting a light-emitting control signal to the pixel circuit;

wherein the apparatus is configured to:

during a first time period, provide an invalid start signal to the gate driving circuit and/or the light-emitting control driving circuit;

during a second time period, turn off a first power signal and a second power signal provided to the pixel circuit;

during a third time period, turn off a third power signal and a fourth power signal provided to the gate driving circuit and/or the light-emitting control driving circuit;

wherein during the first time period, an invalid start signal is provided to the light-emitting control driving circuit; and wherein during the first time period, a valid start signal is provided to the gate driving circuit; and wherein during the first time period, a display data signal corresponding to displaying black is provided to the pixel circuit.

15. The apparatus for driving a display panel according to claim 14, wherein during the first time period, an invalid start signal is provided to the gate driving circuit; and/or wherein during the second time period, an invalid start signal is provided to the gate driving circuit and the light-emitting control driving circuit; and/or wherein the pixel circuit comprises a driving power terminal and a reference power terminal; wherein during the second time period, the driving power terminal and the reference power terminal are grounded; wherein during the second time period, the source driving circuit outputs a grounding signal; and/or wherein during the third time period, a power terminal of the gate driving circuit and/or the light-emitting control driving circuit is grounded.

16. An apparatus for driving a display panel, wherein the display panel comprises a pixel circuit, a gate driving circuit, a source driving circuit, and a light-emitting control driving circuit, wherein the gate driving circuit and the source driving circuit respectively provide scan signals, data signals, to the pixel circuit;

wherein the pixel circuit includes a plurality of pixel units in an array, and each pixel unit includes an OLED element;

wherein the light-emitting control driving circuit is for outputting a light-emitting control signal to the pixel circuit; wherein the apparatus is configured to:

during a first time period, provide an invalid start signal to the gate driving circuit and/or the light-emitting control driving circuit;

during a second time period, provide a first power signal and a second power signal to the pixel circuit;

during a third time period, provide a valid start signal to the gate driving circuit and/or the light-emitting control driving circuit;

during a fourth time period, provide an invalid start signal to the gate driving circuit and/or the light-emitting control driving circuit;

during a fifth time period, turn off the first power signal and the second power signal provided to the pixel circuit; and during a sixth time period, turn off a third power signal and a fourth power signal provided to the gate driving circuit and/or the light-emitting control driving circuit.

17. The apparatus for driving a display panel according to claim 16, wherein the apparatus for driving a display panel is integrated with the display panel.

* * * * *